US011777880B2

(12) United States Patent
Ramirez et al.

(10) Patent No.: US 11,777,880 B2
(45) Date of Patent: Oct. 3, 2023

(54) MESSAGING CLIENT APPLICATION INTEGRATED WITH A CONTENT MANAGEMENT SYSTEM

(71) Applicant: Dropbox, Inc., San Francisco, CA (US)

(72) Inventors: Jason Ramirez, San Francisco, CA (US); Jennifer DiZio, San Francisco, CA (US); Erica Jayne Walsh, San Francisco, CA (US); Ming Li, San Francisco, CA (US); Yenchi Lin, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 60 days.

(21) Appl. No.: 17/022,661

(22) Filed: Sep. 16, 2020

(65) Prior Publication Data

US 2022/0086109 A1    Mar. 17, 2022

(51) Int. Cl.
*H04L 12/58* (2006.01)
*H04L 29/08* (2006.01)
(Continued)

(52) U.S. Cl.
CPC .......... *H04L 51/046* (2013.01); *G06F 9/453* (2018.02); *G06F 11/00* (2013.01); *H04L 51/02* (2013.01);
(Continued)

(58) Field of Classification Search
CPC .......... G06F 9/453; G06F 11/00; H04L 51/02; H04L 51/046; H04L 63/104;
(Continued)

(56) References Cited

U.S. PATENT DOCUMENTS 7,506,027 B1    3/2009  Heald et al.
8,402,095 B2    3/2013  Beauchamp et al.
(Continued)

FOREIGN PATENT DOCUMENTS

WO    2015016237 A1    2/2015

OTHER PUBLICATIONS

Martinez Carreras M.A., et al., "Towards A Semantic-Aware Collaborative Working Environment," Computing and Informatics, vol. 20, V Oct. 11, 2010, Retrieved from the internet: https://pdfs.semanticscholar.org/ac67/84735c18a4fa9a1cc8b0d4873c02874d3c56.pdf, 2001, pp. 1-24.

*Primary Examiner* — Kostas J Katsikis
(74) *Attorney, Agent, or Firm* — Polsinelli PC

(57) ABSTRACT

Systems and methods for integrating a messaging client application with a content management system are provided. In some examples, a method can include receiving messaging content at a content management system from a messaging client application via an application programming interface, the content management system and the messaging client application being on different cloud-based systems. The method can include associating the messaging content with a workspace in the content management system, the workspace including a plurality of users that are authorized to access the workspace to collaborate with each of the plurality of users. The method can further include providing access to the messaging content to the plurality of users that are authorized to access the workspace of the content management system. The method also can include embedding the messaging content in the workspace of the content management system.

21 Claims, 11 Drawing Sheets

(51) Int. Cl.
- *H04L 29/06* (2006.01)
- *H04L 51/046* (2022.01)
- *H04L 51/02* (2022.01)
- *H04L 67/10* (2022.01)
- *G06F 9/451* (2018.01)
- *G06F 11/00* (2006.01)
- *H04L 9/40* (2022.01)
- *H04L 65/403* (2022.01)

(52) U.S. Cl.
CPC ......... *H04L 63/104* (2013.01); *H04L 65/403* (2013.01); *H04L 67/10* (2013.01)

(58) Field of Classification Search
CPC .............. H04L 65/403; H04L 65/4015; H04L 65/4023; H04L 67/10
See application file for complete search history.

(56) References Cited

U.S. PATENT DOCUMENTS

| | | |
|---|---|---|
| 8,510,399 B1 | 8/2013 | Byttow et al. |
| 8,566,403 B2 | 10/2013 | Pascal et al. |
| 8,972,509 B2 | 3/2015 | Maheshwari et al. |
| 9,189,479 B2 | 11/2015 | Spivack et al. |
| 9,374,329 B2 | 6/2016 | Lynch et al. |
| 9,590,958 B1 | 3/2017 | Howell et al. |
| 9,959,327 B2 | 5/2018 | Beausoleil et al. |
| 10,440,023 B2 | 10/2019 | Geisler et al. |
| 2008/0104173 A1 | 5/2008 | Wilcox et al. |
| 2013/0166275 A1* | 6/2013 | Yang .................. G06F 40/58 704/2 |
| 2017/0048285 A1* | 2/2017 | Pearl .................. G06F 16/11 |
| 2018/0176269 A1* | 6/2018 | Griffin ................. H04L 65/403 |
| 2018/0189706 A1* | 7/2018 | Newhouse ........... G06Q 10/101 |
| 2019/0034520 A1* | 1/2019 | Jalagam ............... H04L 65/605 |
| 2020/0068026 A1* | 2/2020 | Morkovine .......... H04L 67/125 |
| 2020/0160458 A1* | 5/2020 | Bodin .................. G06F 8/33 |

* cited by examiner

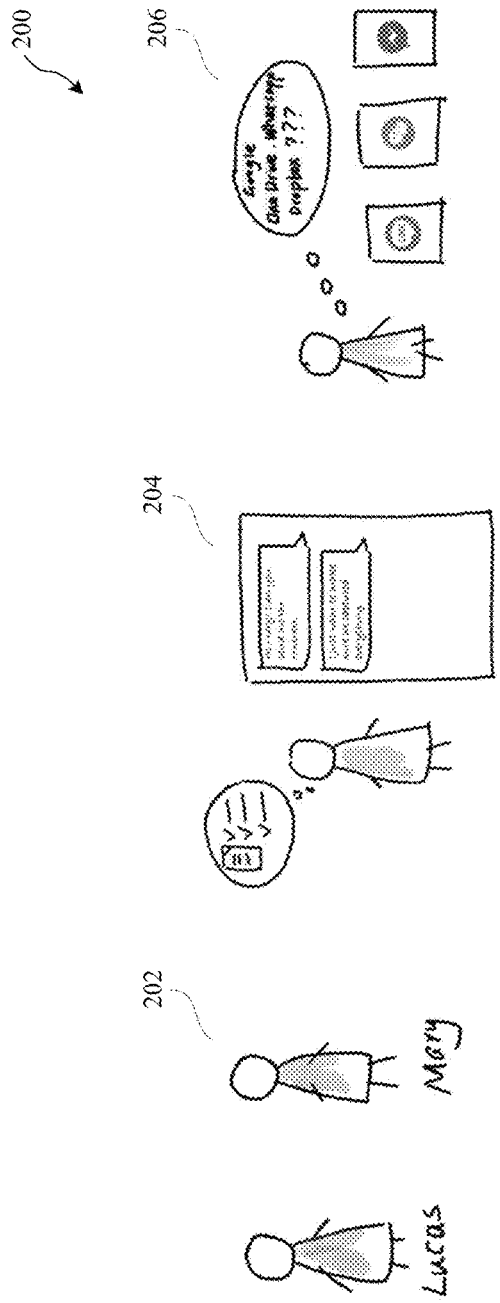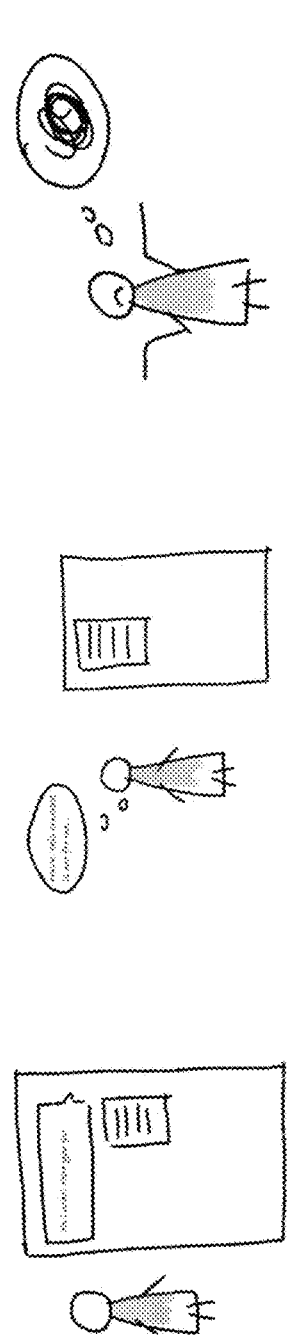
FIG. 2

MESSAGING CLIENT APPLICATION INTEGRATED WITH A CONTENT MANAGEMENT SYSTEM

TECHNICAL FIELD

The present technology pertains to integrating a messaging client with a content management system and in particular, to utilizing a virtual assistant in the messaging client for the purposes of storing content items in the content management system when the content items are shared in the messaging client.

BACKGROUND

Cloud storage systems allow users to store and access data on the cloud. A cloud storage system can allow users to maintain a variety of content items stored on, and accessible from, a single cloud storage system. Some cloud storage systems allow users to share data with other users and access the data in a collaborative fashion. Moreover, some cloud storage systems may also support synchronization of copies of data across a number of client devices and servers so each copy of the data is identical and locally accessible from the client devices. The synchronization functionality can enable users to store local copies of the data on their client devices and access the local copies of the data from their client devices.

Internationally and domestically, workplaces utilize third-party messaging tools such as WhatsApp by Facebook, Inc. of Menlo Park, Calif.; LINE by LINE Corporation of Tokyo, Japan; WeChat by Tencent of Shenzhen, China; and ChatApp by ChatApp, Inc. of Pomona, Calif.; and not email or Slack by Slack Technologies of San Francisco, Calif., to interact with one another when communicating about corresponding work projects. Disadvantageously, these third-party messaging tools are not built for a work-type environment and are unable to provide features related to a proper work experience such as creating, organizing, and searching for content related to messages in the third-party messaging tools.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2 illustrates an example conversation between two users on a messaging application, in accordance with some embodiments of the present technology;

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Figure 1:
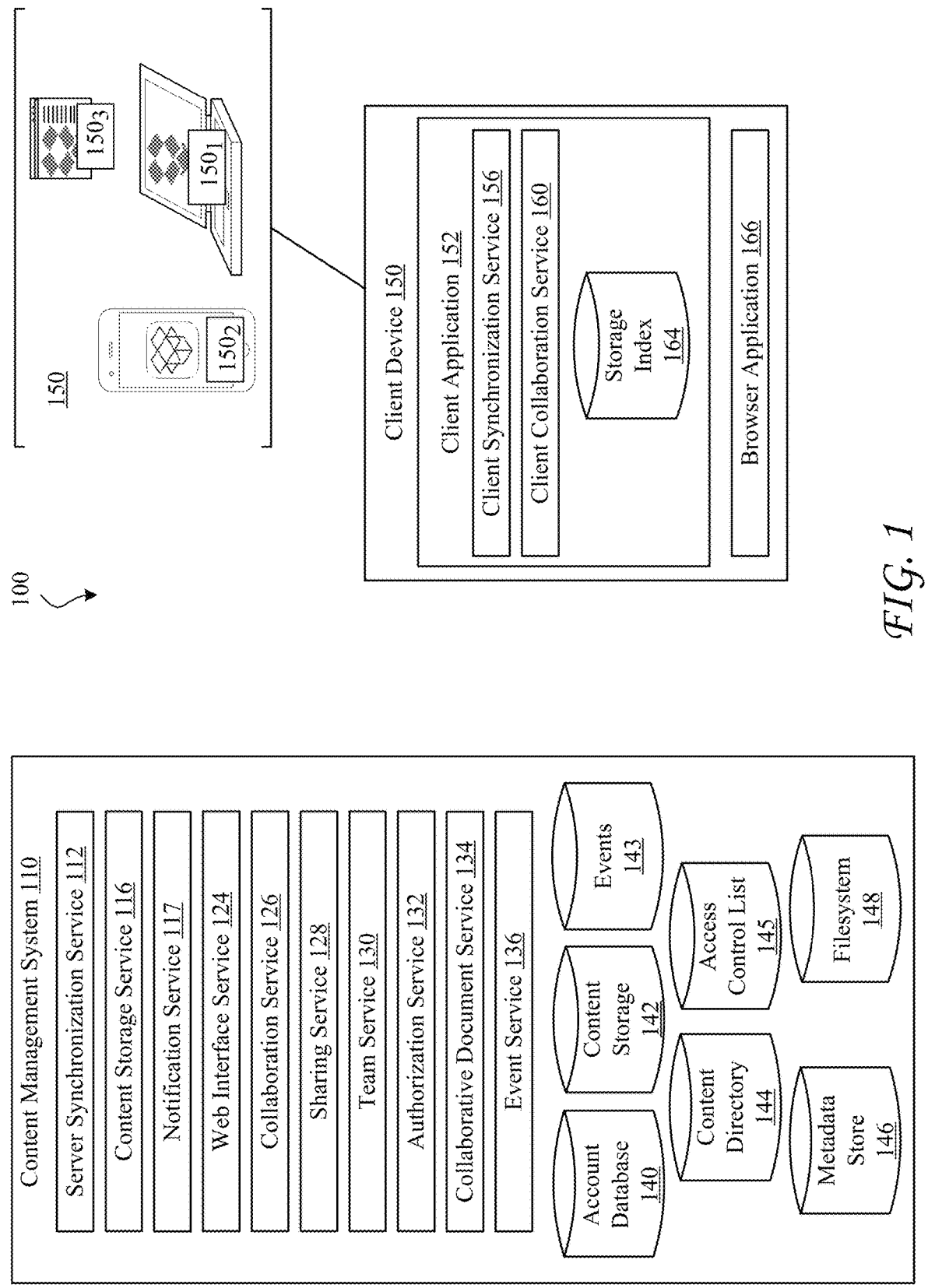
FIG. 1 illustrates an example configuration of a computing environment including a content management system and client devices, in accordance with some embodiments of the present technology.

In some aspects, the disclosed technologies are deployed in the context of a content management system, such as a cloud storage service, having content item synchronization capabilities and collaboration features, among others. An example configuration 100 of a content management system and environment is shown in FIG. 1, which depicts content management system 110 interacting with client device 150.

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (e.g., user, group of users, team, company, etc.) can create an account with content management system 110, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some cases, content storage 142 is combined with other types of storage or databases to handle specific functions. Content storage 142 can store content items, while metadata regarding the content items or objects associated with the content items or user accounts can be stored in metadata store 146. Likewise, data regarding where a content item is stored in content storage 142 can be stored in content directory 144. Additionally, data regarding changes, access, etc., can be stored in filesystem 148.

Each of the various storages/databases such as content storage 142, content directory 144, filesystem 148, and metadata store 146 can be comprised of more than one such storage or database and can be distributed over many devices and locations. Other configurations are also possible. For example, data from content storage 142, content directory 144, filesystem 148, and/or metadata store 146 may be combined into one or more content storages or databases or further segmented into additional content storages or databases. Thus, content management system 110 may include more or less storages and/or databases than shown in FIG. 1.

In some cases, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some cases, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some cases, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata store 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata store 146 can store the content path for each content item as part of a content entry.

In some cases, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata store 146, in association with the unique ID of the content item.

Content storage service 116 can also store a log of data regarding changes, access, etc., in filesystem 148. Filesystem 148 can include the unique ID of the content item and a description of the change or access action along with a time stamp or version number and any other relevant data. Filesystem 148 can also include pointers to blocks affected by the change or content item access. Content storage service can provide the ability to undo operations, by using a content item version control that tracks changes to content items, different versions of content items (including diverging version trees), and a change history that can be acquired from the filesystem 148.

Another feature of content management system 110 is synchronization of content items with at least one client device 150. Client device(s) 150 can take different forms and have different capabilities. For example, client device $150_1$ is a computing device having a local file system accessible by multiple applications resident thereon. Client device 150₂ is a computing device wherein content items are only accessible to a specific application or by permission given by the specific application, and the content items are typically stored either in an application specific space or in the cloud. Client device 150₃ is any client device accessing content management system 110 via a web browser and accessing content items via a web interface. While example client devices 150₁, 150₂, and 150₃ are depicted in form factors such as a laptop, mobile device, or web browser, it should be understood that the descriptions thereof are not limited to devices of these example form factors. For example, a mobile device such as client 150₂ might have a local file system accessible by multiple applications resident thereon, or client 150₂ might access content management system 110 via a web browser. As such, the form factor should not be considered limiting when considering client 150's capabilities. One or more functions described herein with respect to client device 150 may or may not be available on every client device depending on the specific capabilities of the device, the file access model being one such capability.

In many cases, client devices 150 are associated with an account of content management system 110, but in some cases, client devices can access content using shared links and do not require an account.

As noted above, some client devices 150 can access content management system 110 using a browser application 166, such as a web browser. For example, client device 150 can use browser application 166 to access web pages and content on content management system 110. However, client devices 150 can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (e.g., new, deleted, modified, copied, or moved content items) to content items in a designated location of a file system of client device 150.

Content items can be synchronized from client device 150 to content management system 110, and vice versa. In examples where synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some cases, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some cases, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update filesystem 148, metadata store 146, content directory 144, content storage 142, account database 140, etc. as appropriate.

When synchronizing from content management system 110 to client device 150, a mount, modification, addition, deletion, move of a content item recorded in filesystem 148 can trigger a notification to be sent to client device 150 using notification service 117. When client device 150 is informed of the change, request changes can be listed in filesystem 148 at the last synchronization point known to client device 150. When client device 150 determines that it is out of synchronization with content management system 110, client synchronization service 156 requests content item blocks including the changes and updates its local copy of the changed content items.

In some cases, storage index 164 stores tree data structures wherein one tree reflects the latest representation of a directory according to server synchronization service 112, while another tree reflects the latest representation of the directory according to client synchronization service 156. Client synchronization service 156 can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some cases, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Another feature of content management system 110 is to facilitate collaboration between users. Collaboration features include content item sharing, commenting on content items, co-working on content items, instant messaging, providing presence and seen state information regarding content items, etc.

Content management system 110 can manage sharing content via sharing service 128. Sharing content by providing a link to the content can include making the content item accessible from any computing device in network communication with content management system 110. However, in some cases, a link can be associated with access restrictions enforced by content management system 110 and access control list database 145. Sharing content can also include linking content using sharing service 128 to share content within content management system 110 with at least one additional user account (in addition to the original user account associated with the content item) so that each user account can have access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some cases, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some cases, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some cases, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some cases, limited permissions include restrictions that only permit a content item to be accessed from with a specified domain, i.e., from within a corporate network domain, or by accounts associated with a specified domain, e.g., accounts associated with a company account (e.g., @acme.com).

In some cases, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some cases, content management system 110 can designate a URL for uploading a content item. For example, a first user with a user account can request such a URL, provide the URL to a contributing user and the contributing user can upload a content item to the first user's user account using the URL.

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 136 can generate an event for such interaction. When event service 136 detects a user interaction with a content item and/or another user, event service 136 can create an event identifier (e.g., unique event identifier) and event type, and associate the event identifier and event type with the user (e.g., user identifier and namespace identifier) to create an event or event record for the interaction. After the event is created, event service 136 can send the event identifier and any information associated with the event to events store 143 for storage.

Events store 143 can include one or more storage systems, such as one or more databases, for storing events and associated information. In some examples, events store 143 can include a distributed database or distributed storage system. Events store 143 can receive and store the event data for access by content management system 110.

In some cases, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Team service 130 can provide a common shared space for the team, private user account folders, and access limited shared folders. Team service 130 can also provide a management interface for an administrator to manage collections and content items within team, and can manage user accounts that are associated with the team.

In some cases, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g., a user account with user rights and administrator rights) authorization service 132 can also require explicit privilege escalation to avoid unintentional actions by administrators.

In some cases, content management system 110 can provide information about how users with which a content item is shared are interacting or have interacted with the content item. In some cases, content management system 110 can report that a user with which a content item is shared is currently viewing the content item. For example, client collaboration service 160 can notify notification service 117 when client device 150 is accessing the content item. Notification service 117 can then notify all client devices of other users having access to the same content item of the presence of the user of client device 150 with respect to the content item. Content management system 110 (e.g., via event service 136) and/or client device 150 can track user interactions with content, such as read or write events, and maintain a history of such events and interactions for a user (e.g., events store 143).

In some cases, content management system 110 can report a history of user interaction with a shared content item. Collaboration service 126 can query data sources such as events store 143, metadata store 146 and filesystem 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata store 146. In some implementations, collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc. Collaboration service 126 can provide a messaging platform whereby users can send and receive instant messages, voice calls, emails, etc.

In some cases, content management service can also include collaborative document service 134, which can provide an interactive content item collaboration platform whereby users can simultaneously create collaboration content items, comment in the collaboration content items, and manage tasks within the collaboration content items. Collaboration content items can be files that users can create and edit using a collaboration content item editor and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some cases, this can be managed by requiring two users access a content item through a web interface and there they can work on the same copy of the content item at the same time.

In some cases, client collaboration service 160 can provide a native application companion interface for the purpose of displaying information relevant to a content item being presented on client device 150. In examples wherein a content item is accessed by a native application stored and executed on client device 150, where the content item is in a designated location of the file system of client device 150 such that the content item is managed by content application 152, the native application may not provide any native way to display the above addressed collaboration data. In such cases, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some cases, one or more of the services or storages/databases discussed above can be accessed using public or private application programming interfaces. Certain software applications can access content storage 142 via an application programming interface (API) on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some cases, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some cases, client application 152 can be configured to manage and synchronize content for more than one account of content management system 110. In such examples, client application 152 can remain logged into multiple accounts and provide normal services for the multiple accounts. In some cases, each account can appear as folder in a file system, and all content items within that folder can be synchronized with content management system 110. In some cases, client application 152 can include a selector to choose one of the multiple accounts to be the primary account or default account.

While content management system 110 is presented with specific components, it should be understood by one skilled in the art that the architectural configuration of system 100 is simply one possible configuration and that other configurations with more or fewer components are possible. Furthermore, a service can have more or less functionality, even including functionality described as being with another service. Moreover, features described herein with respect to an embodiment can be combined with features described with respect to another embodiment.

While configuration 100 is presented with specific components, it should be understood by one skilled in the art that the architectural configuration of system 100 is simply one possible configuration and that other configurations with more or fewer components are possible.

Cloud storage systems allow users to store and access content items across multiple devices. The content items may include, but are not limited to, files, documents, messages (e.g., email messages or text messages), media files (e.g., photos, videos, and audio files), folders, or any other unit of content. Content items may be shared with multiple users, edited, deleted, added, renamed, moved and/or otherwise accessed or manipulated.

Moreover, as previously explained, international and domestic workplaces utilize third-party messaging tools such as WhatsApp, LINE, WeChat, and ChatApp, and not email or Slack, to interact with one another when communicating about corresponding work projects. Disadvantageously, these third-party messaging tools are not built for a work-type environment and are unable to provide features related to a proper work experience such as creating, organizing, and searching for content related to messages in the third-party messaging tools.

Users of third-party messaging tools can struggle to create an archive of important digital content items and the corresponding chats in which those files are discussed and shared. Moreover, any currently available way of organizing different chats limits a user's ability to efficiently search across all messaging content, especially when the messaging content is spread across different services or separate third-party messaging applications. For example, a user can forget when and where the chat conversation occurred, which requires spending a lot of time searching for keywords and scrolling through old chats from multiple chat platforms. Users also struggle to rely on chat apps such as LINE for key content item task activities like implementing a formal sign-off process on a content item. This can make users feel uneasy because there is no formal agreement, which may force the user to record the chat in an informal manner (e.g., taking a screenshot of the chat conversation). Moreover, users are unable to track action items utilizing traditional chat room conversations as there are no options to assign action items to attendees of the chatroom.

In addition, if information such as conversations and content items exist outside of a content management system and exist only on a user's local device (e.g., being mapped to a local ID of the user's local device and not the content management system) that information is lost. For example, if a company owns a Gmail domain and utilizes Google for Work, the company retains all old emails from its employees as soon as an individual leaves the company. Conversely, when an employee leaves the company, all of the WhatsApp conversations stored in the employee's personal WhatsApp account are gone and deleted from the record.

Furthermore, some workplaces and employees are also being asked to provide specific conversations from projects that were received from different messaging chat applications used by team members of the project. However, this may be impossible as the different messaging chat applications are unable to communicate with one another and provide the requested information and content.

In response to these difficulties, the present disclosure provides a content management system that can integrate with messaging applications to store and aggregate content items and corresponding conversations from different/incompatible third-party messaging applications. An advantage of the integration is a centralized location/workspace where users can access the content items and conversations regardless of whether another user has left the team or been removed from the workspace. The content management system as provided below can further map conversations and content items back to a particular company or administrator or can include an ownership structure to the content items and conversations beyond the individual user.

FIG. 2 illustrates an example conversation between two users on a messaging application 200. Mary is a freelancer and Lucas is one of her clients 202. Mary began drafting the project design and provides the completed project to Lucas for his review. As Lucas reviews the project design 204, he wants to double check the initial contract to make sure every requirement has been addressed. He sends Mary a message on the messaging application asking her to send him the contract.

It has been a while since the project started, and unfortunately, Mary cannot quickly remember where she stored the executed contract 206. After several rounds of searching and browsing across different services and messaging applications, Mary finds a copy of the contract and sends it to Lucas over the messaging application 208. Lucas reviews the contract provided by Mary and realizes that the document is an old version of the contract 210. The old version of the contract does not have the comprehensive list he was looking for and is frustrated. Mary is embarrassed that she could not complete this simple task efficiently and frustrated that all of her files had been stored in different platforms and messaging applications 212.

The technologies herein can provide an integrated and unified solution that address or overcome the foregoing and other technical problems and limitations. For example, the technologies herein relate to systems and processes to integrate third-party messaging tools, such as ChatApp, with content management systems to manage and incorporate content items related to messages (e.g., "chats") into the content management systems. Additionally, content items related to messages in the chat group can be automatically saved in a smart workspace via user interaction or a virtual assistant of the content management system, which can then be searched at a future time as further discussed below. Implementations of the smart workspace, virtual assistant, and content management system are further discussed below in detail.

The smart workspaces as described herein can include one or more processors along with memory that can be configured to generate and consolidate chats and content items in a manageable platform that can be searched at a future time and enable users to smartly collaborate with one another, such as through posting action items and providing budget requests. Workspace management can also include adding chat groups from different chat applications within the smart workspace (e.g., including chats, files, photos, tasks, and timelines). Content items can also be automatically saved to the smart workspace of a content management system along with the corresponding chats to provide a collaboration platform among users. In-application commands can also be utilized to request approvals and assign action items from team leaders.

In some examples, users can create smart workspaces that incorporate their messages and content items directly from third-party messaging tools. Furthermore, users can continuously add different chat groups from different third-party messaging tools to a corresponding smart workspace to further collaborate with users that utilize other third-party messaging tools. In-application commands (e.g., application icons and widgets) can also be utilized to generate smart workspaces, link smart workspaces to chat groups, request approvals, provide content items, and assign action items to corresponding smart workspaces.

Other examples include the smart workspace having information such as the name of the smart workspace, chat groups linked with the smart workspace, content items of the smart workspace, timeline of events associated with the smart workspace, or any other information suitable for the intended purpose and understood by a person of ordinary skill in the art.

Furthermore, the smart workspaces described herein allow users to continue using the messaging applications of their preference and not one that is solely usable only within another program or application. The smart workspaces described herein also allow users to search and share content items across different messaging applications that do not coordinate with one another. The system of utilizing smart workspaces also provides sharers of content items to have confidence that their content items were received (e.g., providing an acknowledgment of receipt), more control features over the shared content items can be utilized, and other ecosystems can be seamlessly integrated.

Figure 3:
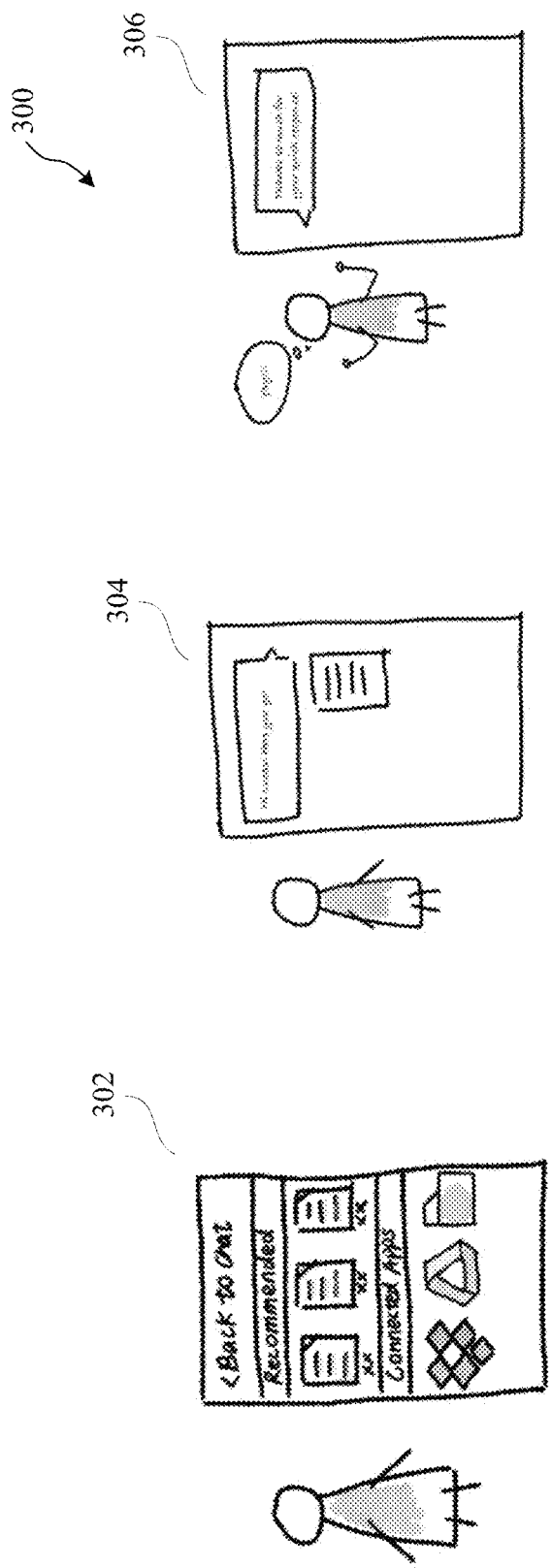
FIG. 3 illustrates an example conversation between two users on a messaging application with smart workspaces and a virtual assistant, in accordance with some embodiments of the present technology.

FIG. 3 illustrates an example conversation between two users on a messaging application with smart workspaces and a virtual assistant 300, in accordance with some embodiments of the present technology. The virtual assistant can be integrated to communicate with the chat application and the smart workspace, and can provide various functions to each of the users as described herein.

In this conversation, Mary opens the virtual assistant in the chat application that is integrated with the smart workspaces 302. The virtual assistant can recommend and present relevant files from across a plurality of communication platforms to Mary based on the context and keywords in her chat with Lucas. In this example, the virtual assistant recommends the executed contract. In some instances, Mary can search for keywords manually such as "contract" or "agreement" to find the contract requested by Lucas. Mary may also perform a keyword search for "contract" and "Lucas" to narrow the search field. As the smart workspace for Lucas is subset of all of the smart workspaces, Mary does not have to search all of the workspaces available on a content management system, but rather, Mary can perform a directed search of the contract in smart workspaces that correspond to Lucas.

Mary can preview the contract that is recommended by the virtual assistant, and in turn, feel confident that the recommended contract is the correct document 304. Mary then shares the content item directly in the chat using the virtual assistant. Alternatively, Mary can select and drop the document into the chat so that Lucas can access the contract. Lucas is impressed that Mary was able to provide the contract in a quick and organized manner 306.

Figure 4:
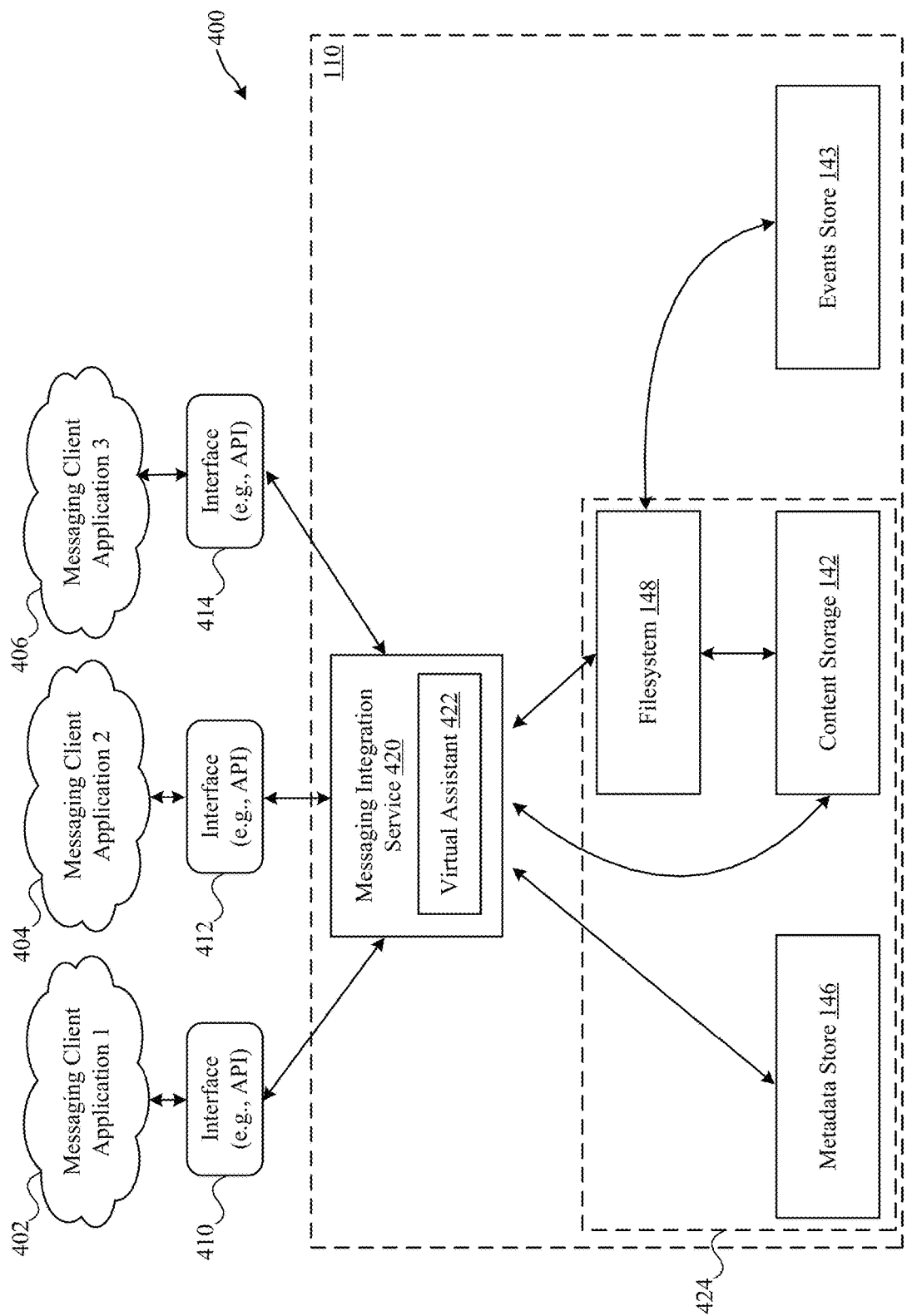
FIG. 4 illustrates an example architecture for integrating messaging content applications with a content management system and a virtual assistant, in accordance with some embodiments of the present technology.

FIG. 4 illustrates example architecture 400 for integrating a messaging client application 402, 404, 406 with content management system 110. In this example, multiple messaging client applications 402, 404, 406 can be communicatively coupled with content management system 110 such that content items can be shared between messaging client applications 402, 404, 406 and content management system 110. Messaging client applications 402, 404, 406 can be installed and utilized on client devices 150 such as a mobile phone, personal computer, and tablet.

In some instances, messaging client applications 402, 404, 406 can communicate with messaging integration service 420 via interfaces 410, 412, 414, to receive or provide data and/or metadata associated with content items. Messaging integration service 420 can include a virtual assistant 422 that can also receive and provide data and content items between messaging client applications 402, 404, 406 and content management system 110. Virtual assistant 422 can be implemented using computer software, firmware, artificial intelligence, machine learning, or any combination thereof, to perform the various operations described herein. In other embodiments, virtual assistant 422 can be installed on client devices 150 to receive and provide data and content items between messaging client applications 402, 404, 406 and content management system 110.

Interfaces 410, 412, 414 can be, for example, APIs for exchanging data between messaging integration service 420 and messaging client applications 402, 404, 406. Messaging integration service 420 can be a service that implements logic and/or functionalities for interacting with messaging client applications 402, 404, 406 and/or content items on or supported by messaging client applications 402, 404, 406, such as cloud-based or cloud-backed content items. In some examples, messaging integration service 420 can communicate with messaging client applications 402, 404, 406 to receive data and/or cloud functionalities, such as cloud-based collaboration functionalities that can be provided by smart workspaces 424 to allow users to collaborate with one another and pool their data and/or content items to a viewable smart workspace location. In some implementations, smart workspace 424 can include and/or utilize filesystem 148, content storage 142, and metadata store 146 to provide services such as receiving, storing, coordinating, and providing data with messaging client applications 402, 404, 406 via messaging integration service 420 or virtual assistant 422. For example, messaging integration service 420 can associate content items of messaging client applications 402, 404, 406 with smart workspace 424 of content management system 110. In another example, virtual assistant 422 can associate content items of messaging client applications 402, 404, 406 with smart workspace 424 of content management system 110.

Virtual assistant 422 can also facilitate a service that implements logic and/or functionalities for interacting with messaging client applications 402, 404, 406 and/or content items on or supported by messaging client applications 402, 404, 406, such as cloud-based or cloud-backed content items. In some examples, virtual assistant 422 can communicate with messaging client applications 402, 404, 406 to receive data and/or cloud functionalities, such as cloud-based collaboration functionalities.

In some examples, by consolidating chats and content items into smart workspace 424 via messaging integration service 420 or virtual assistant 422, the authorized users of smart workspace 424 can collaboratively work together on projects. For example, the users can set up action items with respective due dates, view historical chats to determine how a particular project may have changed, and determine which content items are the most current version of the particular content item.

In some implementations, messaging client applications 402, 404, 406 can utilize different chat applications that may not typically coordinate or communicate with one another due to incompatibility, company policy, application rules, etc. By receiving data, chats, and content items from non-compatible or compatible messaging applications on messaging client applications 402, 404, 406, messaging integration service 420 and virtual assistant 422 can provide cloud-based collaboration functionalities to the users associated with smart workspace 424 of content management system 110. For example, messaging client applications 402, 404, 406 may not store chatroom conversations as historical data because of company policy, user preference, data privacy rules, etc. As such, messaging collaboration architecture 400 can consolidate and store historical conversations and content items provided in messaging client applications 402, 404, 406 in smart workspace 424 so that users may readily access the data at any given time. In some implementations, messaging integration service 420 can provide access to content items associated with smart workspace 424 of content management system 110 to users that are authorized to access smart workspace 424 of content management system 110. In another implementation, virtual assistant 422 can provide access to content items associated with smart workspace 424 of content management system 110 to users that are authorized to access smart workspace 424 of content management system 110.

Without consolidating and storing historical and contemporaneous conversations and content items from users utilizing messaging client applications 402, 404, 406, important comments, conversations, content items, etc. would be lost and untraceable, creating a void in the timeline of the project. By storing messages and content items within smart workspace 424 of content management system 110, future users can filter through all of the material and find comments and content items directed to a particular question such as "who provided approval for finalizing the project, who uploaded the most recent contract version onto the workspace, and were all action items completed?"

Examples of cloud-based collaboration functionalities by messaging integration service 420 can include functionality for communicating with messaging client applications 402, 404, 406 to retrieve metadata associated with content items from messaging client applications 402, 404, 406; updating metadata associated with the content items; communicating with messaging client applications 402, 404, 406 to retrieve and update content associated with content items; sending content and/or metadata associated with content items to messaging client applications 402, 404, 406; exchanging activity information associated with content items with messaging client applications 402, 404, 406; authenticating with messaging client applications 402, 404, 406; and providing tokens or authentication information to messaging client applications 402, 404, 406 for authentication with content management system 110.

Non-limiting examples of operations supported by messaging integration service 420 include operations to create content items; operations to authenticate with messaging client applications 402, 404, 406; operations to receive or update metadata associated with content items stored on or supported by one or more of messaging client applications 402, 404, 406; operations to retrieve content items and/or related data from content storage 142, client device 150, and/or messaging client applications 402, 404, 406; operations to restore content items and/or associated data or request restoration of such content items and/or associated data from messaging client applications 402, 404, 406; commenting operations; operations to generate and/or present previews of content items; operations to share content items and/or associated data; operations to revert to previous versions of content items; operations to modify (rename, move, delete, edit, etc.) content items; and so forth.

Messaging integration service 420 can communicate with filesystem 148 to store or access metadata associated with content items from messaging client applications 402, 404, 406. Filesystem 148 can store and provide such metadata for use by messaging integration service 420 or any other service in content management system 110. The metadata can include, for example, and without limitation, information regarding changes to the content items, access information associated with the content items, data logs associated with the content items, unique identifiers (IDs) associated with the content items, description information associated with the content items, version numbers or information associated with the content items, timestamps associated with filesystem entries corresponding to the content items, change history information for the content items, and pointers to content associated with the content items, folders, file paths, etc.

Messaging integration service 420 can also communicate with metadata store 146 to update or retrieve metadata and objects in metadata store 146. Metadata store 146 can store other metadata and objects such as entities or associations pertaining to user accounts, content items, user groups, namespaces, memberships, etc. For example, metadata store 146 may store, without limitation, metadata describing content items, content item types, comments, indexing data, access permissions, user or group memberships, sharing information, etc. In some examples, metadata store 146 can also store information describing the relationship of content items to one or more accounts, collections, groups, namespaces, folders, team entities, etc., in metadata store 146.

Messaging integration service 420 can communicate with content storage 142 to store and/or retrieve content items from content storage 142. Messaging integration service 420 can store and retrieve content items. For example, in some cases, content storage 142 may store the content items for access to the content directly from content storage 142. In this example, messaging integration service 420 may retrieve, store, or update such content in content storage 142.

Messaging integration service 420 can also communicate with events store 143 to store, retrieve, and/or update activity and event information associated with content items. Messaging integration service 420 can monitor events or activity from events store 143, obtain status information associated with content items from events store 143, process events and/or metrics based on information in events store 143, generate or provide notifications or alerts based on information in events store 143, etc.

Figure 5:
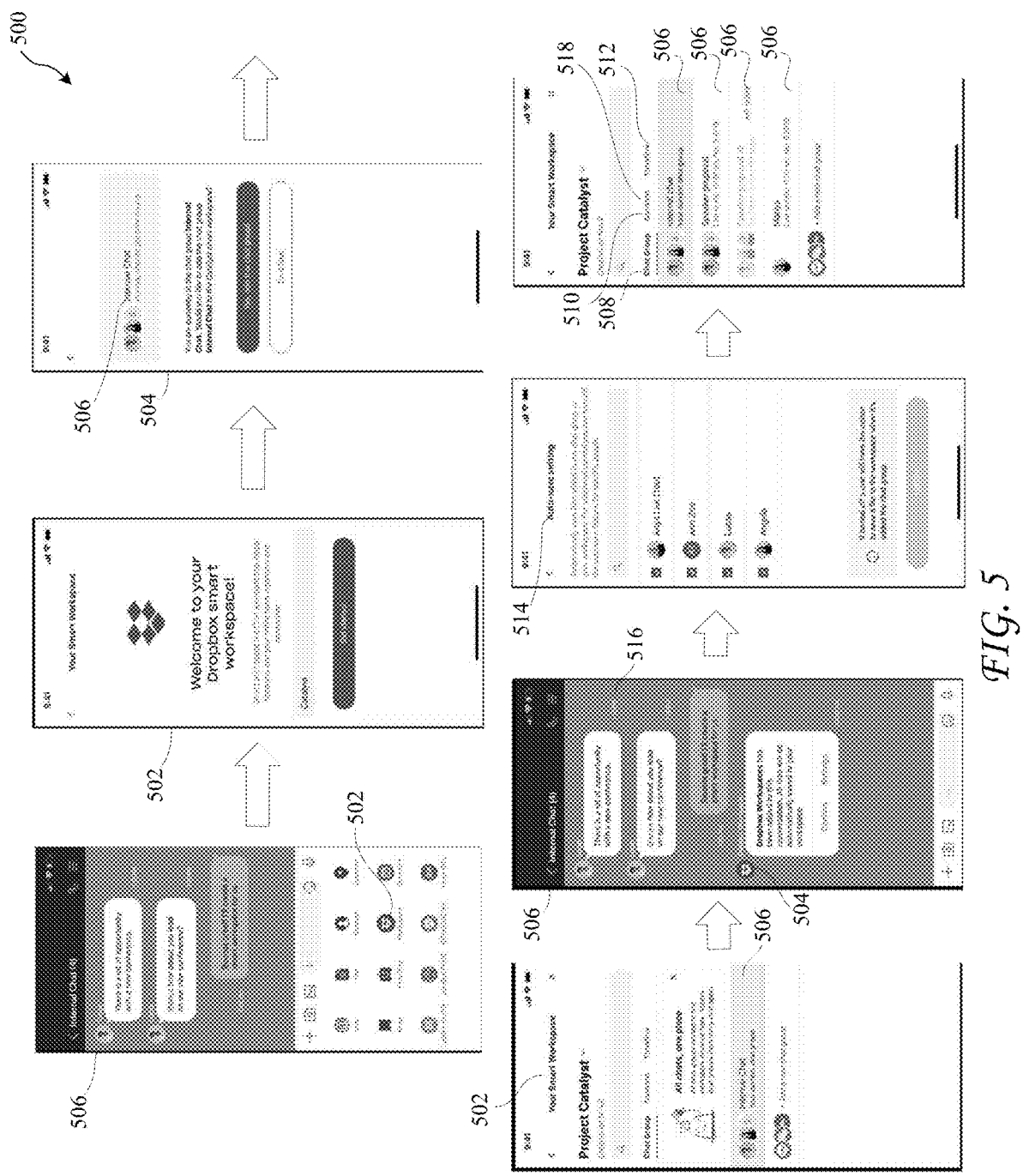
FIG. 5 illustrates an example messaging application including an integrated smart workspace, in accordance with some embodiments of the present technology.

FIG. 5 illustrates an example messaging application 500 including an integrated smart workspace 502, in accordance with some embodiments. In some instances, the messaging application 500 can include a user interface that provides conversations of the chat group 506 and in-application commands such one for smart workspace 502. In some examples, the smart workspace 502 can include the filesystem 148, the content storage 142, and the metadata store 146 of FIG. 4 to receive, store, coordinate, and provide data with the messaging client applications 402, 404, 406 via the messaging integration service 420 or the virtual assistant 422.

During a conversation 506 between Lucas and Anya, Lucas requests that Anya lead the conference. In response, Anya creates a smart workspace 502 for the conversation 506 between Lucas and her. In some instances, Anya can select the in-application command "Workspace" 502 to initiate the population of the smart workspace 502. In other instances, a virtual assistant 504 of a smart workspace 502 may be present in the messaging application 500 and automatically generate a smart workspace 502 to facilitate the conversation 506 between Lucas and Anya.

The smart workspace 502 can be generated and include a chat/virtual assistant 504 that helps keep users and the team organized and productive. In this example, smart workspaces 502 can be named automatically by the virtual assistant 504 or designated by a user. In FIG. 5, the smart workspace 502 is "Catalyst." Next, the virtual assistant 504 of the smart workspace 502 can inquire to the user whether a particular chat group 506 (e.g., Internal Chat) is to be integrated and associated with the Catalyst smart workspace 502. The user can then select an option to link a specified chat group 506 from a messaging application 500 with the smart workspace 502. The virtual assistant 504 can initiate an inquiry when a user enters a chat group 506, when a user instructs the virtual assistant 504 to associate a chat group 506 with a smart workspace 502, and when the virtual assistant 504 detects that users in the chat group 506 are discussing a corresponding smart workspace 502. The virtual assistant 504 may initiate the linking of a chat group 506 and a corresponding smart workspace 502 automatically or manually by any of the users of the chat group 506.

The smart workspace 502 can include information such as the name of the smart workspace 502, chat groups 506 linked with the smart workspace 502, content items 518 of the smart workspace 502, timeline of events 512 associated with the smart workspace 502, or any other information suitable for the intended purpose and understood by a person of ordinary skill in the art. The smart workspace 502 may be populated by a user of the smart workspace 502. For example, an authorized user of the smart workspace 502 may name the smart workspace 502 "Project Catalyst," form chat groups 506 that are communicatively coupled to the smart workspace 502, and invite other users to the chat group 506 to participate in the smart workspace 502 (e.g., record chats and upload content items 518). Users or designated users of the chat group 506 may further invite other users to join the smart workspace 502. Such invitations can include links, messages, or emails providing access to the smart workspace 502. Upon approval, by a user or the virtual assistant 504, the approved user can receive a message in the chat group 506 or a link from the virtual assistant 504 providing access to the shared collections associated with the smart workspace 502. Authorized access to the chat group 506 and the smart workspace 502 can be saved on the client device 150 and messaging client applications 402, 404, 406. Furthermore, the messaging integration server 420, the virtual assistant 504, the smart workspace 502, or the content management system 110 can verify the user seeking authorization to join the smart workspace 502 to determine a permission level for the requesting user. If the requesting user is on a permitted user list, then the requesting user is added to the smart workspace 502. If the requesting user is not on the permitted user list, then the requesting user can receive a link or message from the content management system 110 via the messaging integration service 420 providing access or access instructions to join the smart workspace 502.

In other examples, the virtual assistant 504 may automatically generate a smart workspace 502 based on conversations in the chat group 506. For example, during a conversation in the chat group 506, the virtual assistant 504 may detect keywords and inquire to the users whether a smart workspace 502 should be generated to capture the conversations and content items 518 in the chat group 506. Upon approval, the virtual assistant 504 may generate the smart workspace 502 and populate the smart workspace 502 with content items 518 and past conversions 506 related to the subject matter of the smart workspace 502.

In FIG. 5, the Chat Group tab 508 illustrates all chat groups 506 related to the smart workspace 502, which can include chat groups 506 from different chat/messaging applications 500. In Project Catalyst, the smart workspace 502 includes Internal Chat 506 with the possibility of adding more chat groups 506 from similar or different messaging applications 500.

After the smart workspace 502 has been generated and the corresponding chat groups 506 linked with the smart workspace 502, the virtual assistant 504 can notify users in the chat group 506 that the smart workspace 502 has been added to the conversation 506 and that all or some content items will be automatically saved to the smart workspace 502. In some instances, the entire or a portion of the conversation in the chat group 506 can be saved and stored in the smart workspace 502. This can include past, current, and future conversations in the chat group 506. For example, when it is determined that a chat group 506 is to be associated with a smart workspace 502, the virtual assistant 504 can analyze the entire conversation or a portion of the conversation 506 to include portions of the conversation 506 that occurred prior to the chat group 506 being associated with the smart workspace 502. In other examples, a user of the chat group 506 may elect to have the entire conversation 506 saved to the smart workspace 502, or a point in time at which the conversation 506 begins to be saved to the smart workspace 502.

In some implementations, content items can be added directly to the smart workspace 502 from users of the chat groups 506 or authorized users who are not included in the chat group 506. For example, an administrator of the smart workspace 502 may add content items such as action items or documents to the smart workspace 502 for users of the chat group 506 to access or view. When content items and messages are added directly to the smart workspace 502, users of the chat group 506 may be notified by a link, message, email, etc., and gain access to the newly added content items and messages. Furthermore, when content items 518 and messages are generated or added to the chat group 506 (smart workspace), the smart workspace 502 can also timestamp 516 each file and/or message along with the associated user who added the content item 518 or message.

The virtual assistant 504 of the smart workspace 502 can also include settings that can be changed by the user. For example, an auto-save setting can be included in the smart workspace 502 settings. The auto-save feature can automatically save content items added to the chat group 506 to the designated smart workspace 502. For additional control, the user (either the user that generated the smart workspace 502 or another user) can turn off the auto-save feature for specific users/people. The main user may want to exclude messages and/or content items 518 from a particular user from being added to the smart workspace 502. By selecting and deselecting users, the main user can control which messages and content items 518 are automatically added to the smart workspace 502. If the auto-save feature is turned off for a particular user, the excluded user may still have the option of saving/adding content items 518 to the smart workspace 502 when the content item 518 is added to the chat group 506. In such an instance, the virtual assistant 504 may inquire whether a content item 518 should be added to the smart workspace 502 after a user adds the content item 518 to the chat group 506. In other instances, an option may be available next to the content item 518 that is added to the chat group 506 that allows the user and other users to elect to add the content item 518 to the smart workspace 502.

The Chat Group tab 508 of the smart workspace 502 may also provide the user the opportunity to associate and/or link the smart workspace 502 to other chat groups 506. For example, the virtual assistant 504 or smart workspace 502 may determine that the user is discussing a particular topic that is associated with the smart workspace 502 in a different chat group 506. The virtual assistant 504 may arrive at this determination by comparing keywords in the smart workspace 502 with keywords in the different chat group 506. By arriving at this determination, the virtual assistant 504 may notify or provide an option to the user to link the different chat group 506 with the smart workspace 502 that is already associated with a particular topic or project.

The smart workspace 502 may also make this determination by processing metadata from messaging applications 500 and determine whether a chat group 506 should be linked with a particular smart workspace 502. The virtual assistant 504 may automatically add chat groups 506 to corresponding smart workspaces 502, or a user may manually add a chat group 506 to a smart workspace 502 by linking the smart workspace 502 and the chat group 506 with an in-application command as described herein. By selecting the in-application command, the user can also designate which chat groups or conversations are to be linked with the smart workspace 502. This linked relationship can further be stored in the messaging client application 402, 404, 406 of the client device 150 to continue exchanging content items and conversations between the messaging client application 402, 404, 406 and the smart workspace 502. The user may also subscribe to a feed for updates regarding the established relationship between the smart workspace 502 and the messaging client application 402, 404, 406 including new conversations, users, and content items.

In some instances, the smart workspace 502 can also include a Content tab 510 that includes a list of content items 518 added to the smart workspace 502, keywords determined to be relevant to the smart workspace 502 and corresponding chat groups 506, or any other content suitable for the intended purpose and understood by a person of ordinary skill in the art.

In other instances, the smart workspace 502 can include a timeline of events 512. The timeline of events 512 can include time stamps 516 and associated users of the content items 518 and messages added to the smart workspaces 502. The Timeline tab 512 can provide users with a convenient display of relevant content items 518 and/or messages that pertain to the smart workspace 502. The user can also select, add, or designate particular messages and content items 518 to be in the Timeline tab 512. The content items 518 in the Timeline tab 512 can also be selected as being more important than others to emphasize and easily view the important matters.

Figure 6:
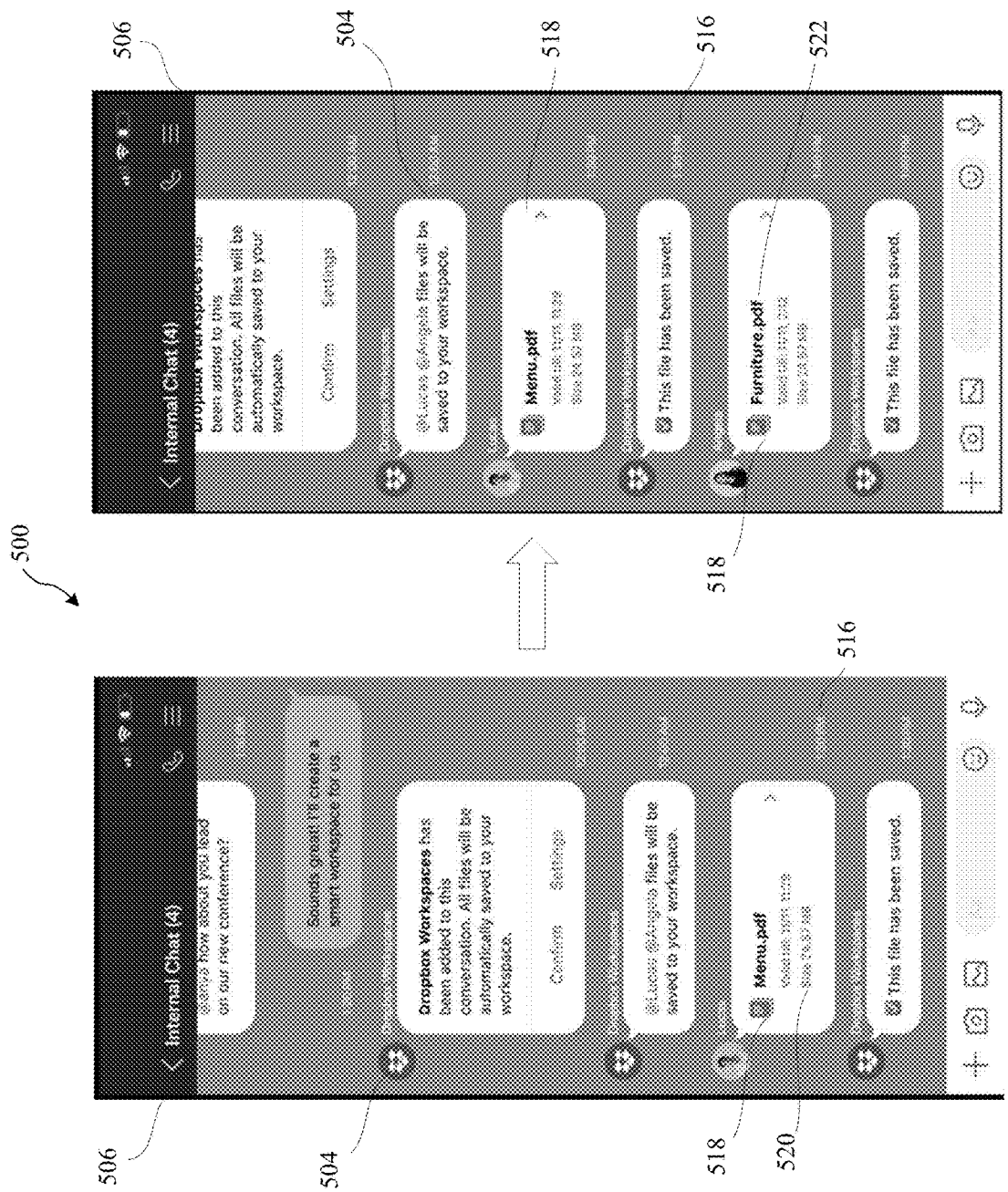
FIG. 6 illustrates an example messaging application including an integrated smart workspace that incorporates digital files, in accordance with some embodiments of the present technology.

FIG. 6 illustrates an example messaging application 500 including an integrated smart workspace 502 that incorporates content items 518, in accordance with some embodiments of the present technology. After the virtual assistant 504 of the smart workspace 502 notifies the group of users that the smart workspace 502 will save the conversation 506 and all content items 518 to the smart workspace 502, the virtual assistant 504 can also individually notify each user that any content item 518 that they add to the conversation 506 will be saved to the smart workspace 502.

Content items 518 that are added to the conversation 506 can include time stamp 516 and file size information 520. The virtual assistant 504 of the smart workspace 502 can also confirm that a content item 518 has been saved to the smart workspace 502 so that the user that added the content item 518 receives confirmation of the same. In this instance, the user has the peace of mind that their content item 518 has been added to the smart workspace 502. As an example, file types 522 of the content items 518 can also be provided and displayed in the messaging application 500 so that team members can conveniently understand the type of document 522 being saved to the smart workspace 502.

Figure 7:
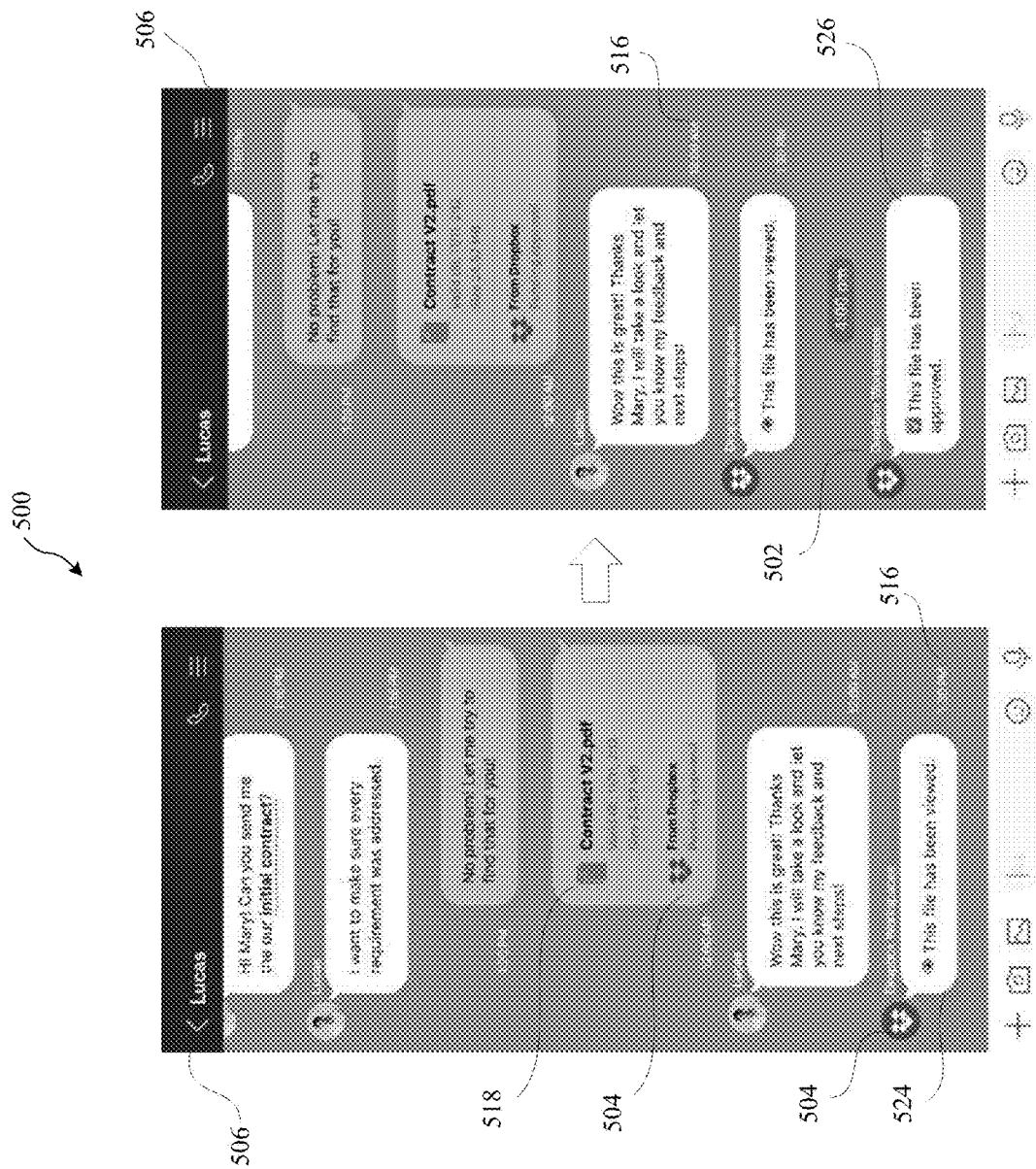
FIG. 7 illustrates another example messaging application including an integrated smart workspace that incorporates digital files, in accordance with some embodiments of the present technology.

FIG. 7 illustrates another example messaging application 500 including an integrated smart workspace 502 that incorporates content items 518, in accordance with some embodiments of the present technology. In this example, a chat group conversation 506 between Lucas and Mary from FIG. 3 is illustrated. Lucas first requests the initial contract from Mary to make sure every requirement was addressed. Mary responds by confirming the request and begins to search for the requested contract.

The search can initially be performed manually by Mary. For example, Mary can instruct virtual assistant 504 to search for keywords such as "initial" and "contract." In other examples, the search can be performed automatically by the virtual assistant 504, such as by the virtual assistant 504 scanning the conversion in the group chat 506. For example, virtual assistant 504 may scan the conversion in the group chat 506 in real-time or past conversations, and upon detection of keywords such as "requests," "get me," and "I want," virtual assistant 504 may search for content items associated with the search keywords that were detected in the group chat 506.

As the smart workspace 502 is linked with the chat group 506, the virtual assistant 504 can determine whether a request has occurred by the conversation occurring between the users of the messaging application 500. In this instance, Lucas mentioned "contract" and "can you send me." The virtual assistant 504, upon receiving such keywords, can begin a search for the keyword "contract." Upon completion of such a search, the virtual assistant 504 can present the search results to the user (i.e., Mary). The user can then select whether the content item 518 found by the virtual assistant 504 is the correct content item 518 requested by the other user (i.e., Lucas). Upon selection, the virtual assistant 504 can add the requested content item 518 to the chat group conversation 506. A user can also perform a keyword search manually to find particular content items 518 and conversations.

In FIG. 7, Lucas thanks Mary for finding and providing the requested content item 518, which Mary may not have been able to find without the assistance of the smart workspace 502. The virtual assistant 504 can also determine whether the added content item 518 has been viewed 524 by the other user. The message from the virtual assistant 504 confirming that the added content item 518 had been viewed 524 may also include a time stamp 516 so that the other user know when the content item was viewed 524. Moreover, if the added content item 518 includes an approval request, the virtual assistant 504 can add a message to the chat group 506 acknowledging that the content item 518 has been approved 526. The virtual assistant 504 can also include which user approved 526 the content item 518.

Figure 8:
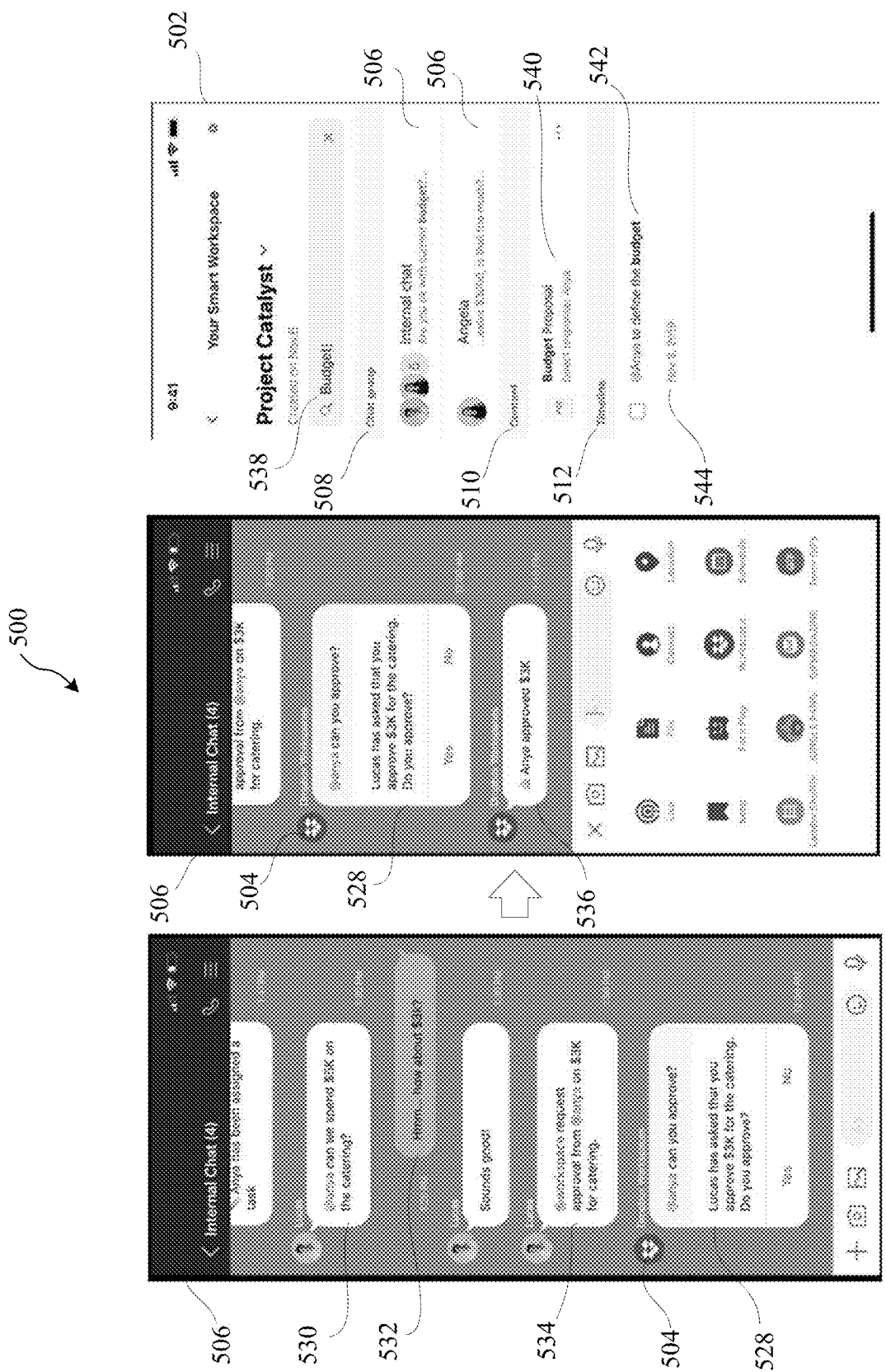
FIGS. 8A, 8B, and 8C illustrate an example messaging application including an integrated smart workspace that incorporates funding/budget approvals, in accordance with some embodiments of the present technology.

FIGS. 8A, 8B, and 8C illustrate an example messaging application 500 including an integrated smart workspace 502 that incorporates funding/budget approvals 528, in accordance with some embodiments of the present technology. FIGS. 8A and 8B illustrate a conversation 506 between Lucas and Anya regarding a budget/funding request 528. Lucas inquires to Anya whether the team can spend $5,000 on catering 530. Anya responds by stating that $3,000 may be more appropriate for the event and budget constraints 532. Lucas agrees and requests the virtual assistant 504 to provide a request approval to Anya for the amount of $3,000 for catering 534. The virtual assistant 504 then provides an approval request 528 to Anya stating that "Lucas has asked that you approve $3 k for the catering. Do you approve?" If Anya approves the approval request 536, the virtual assistant 504 of the smart workspace 502 can add a message to the messaging application 500 stating that Anya has approved the approval request for $3,000.

FIG. 8C illustrates a search for the keyword "budget" 538. By searching for "budget" 538, the smart workspace 502 can display where and when the keyword was found. For example, the keyword "budget" 538 is found in "Internal Chat" 506 and "Angela" 506. Short segments of the sentence including the searched keyword 538 may also be displayed so that the searching user can quickly determine if that is the conversation 506 they are looking for. An example of a search result for the keyword "budget" 538 under Content 510 is provided (e.g., "Budget Proposal" 540). The keyword "budget" 538 is also found in the Timeline section 512 as "@Anya to define the budget" 542. Time stamps 544 and locations of search results can also be provided to the user by the smart workspace 502.

Figure 9:
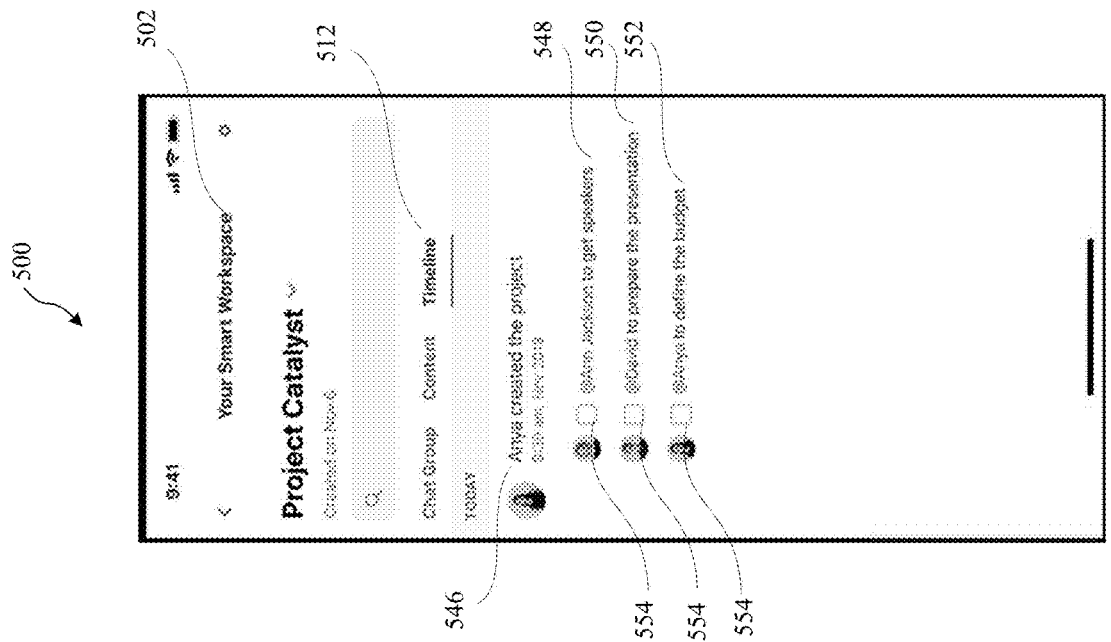
FIG. 9 illustrates an example messaging application including an integrated smart workspace that incorporates action items, in accordance with some embodiments of the present technology.

FIG. 9 illustrates an example messaging application 500 including an integrated smart workspace 502 that incorporates action items 546, in accordance with some embodiments of the present technology. The Timeline tab 512 of the smart workspace 502 can also include action items 546 and the corresponding users assigned to each action item 548, 550, 552. For example, Anya has created a project and assigned particular action items 546 to team members: Ann Jackson is assigned to "get speakers" 548, David is assigned to "prepared the presentation" 550, and Anya is assigned to "define the budget" 552. These action items 548, 550, 552 can be populated and added by any of the team members in the group 506. The action items 548, 550, 552 can also include a selectable option 554 that provides a visual note of whether the action item 548, 550, 552 has been completed. For example, in FIG. 9, check boxes 554 are available for a user to "check" when an action item 548, 550, 552 is complete.

Figure 10:
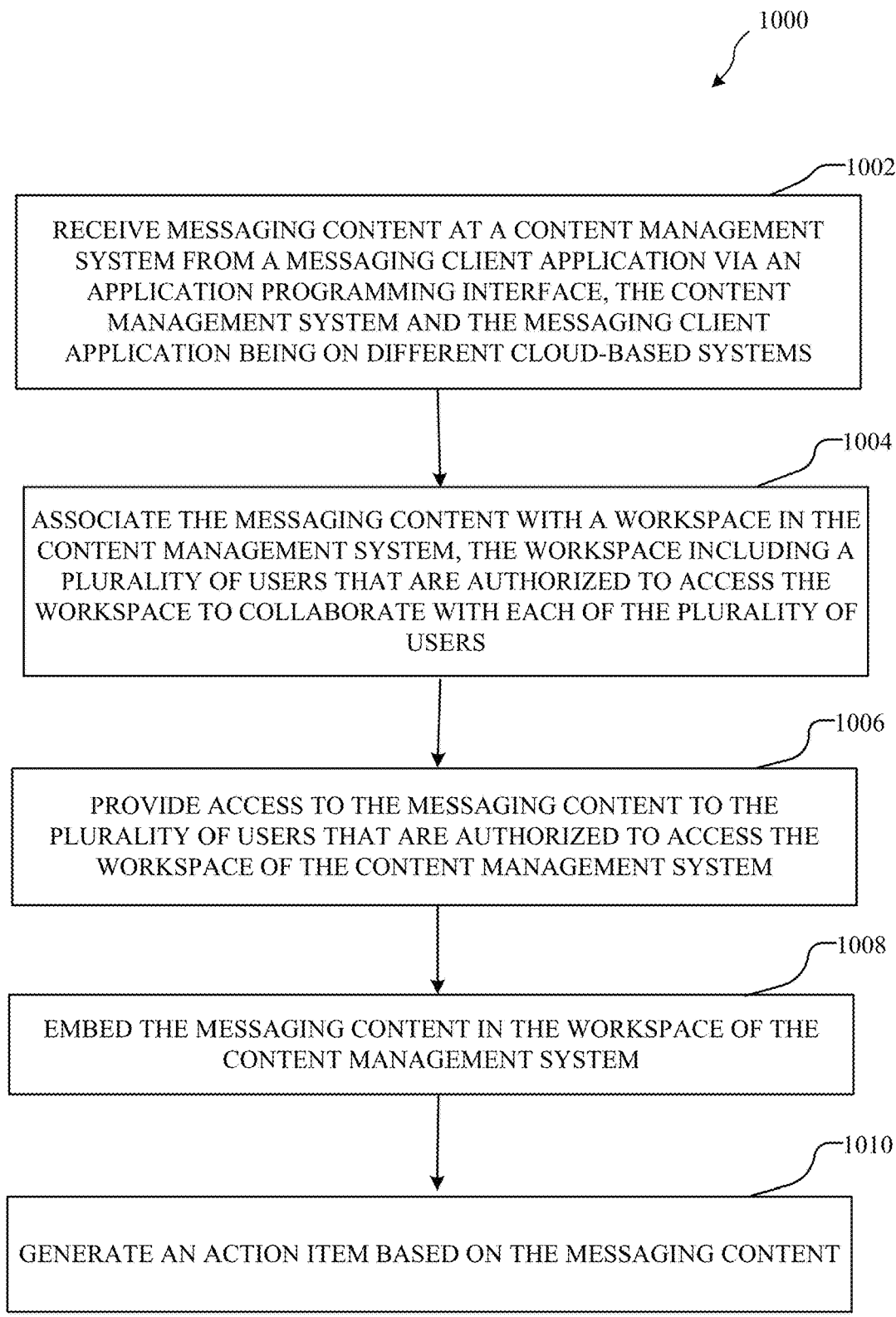
FIG. 10 illustrates an example method for integrating messaging content applications with a content management system in accordance with some embodiments of the present technology.

Having disclosed example system components and concepts, the disclosure now turns to example method 1000 for integrating a plurality of messaging client applications with a content management system where the messaging client applications cannot communicate with one another, as shown in FIG. 10. The steps outlined herein are non-limiting examples provided for illustration purposes and can be implemented in any combination thereof, including combinations that exclude, add, or modify certain steps.

At step 1002, method 1000 can include receiving messaging content at a content management system from a messaging client application via an application programming interface. In some embodiments, the content management system and the messaging client application being on different cloud-based systems. For example, the content management system may be on a cloud-based system offered by Dropbox, Inc. of San Francisco, Calif., while the messaging client application may be supported by a cloud-based system offered by Apple Inc. of Cupertino, Calif., both of which may be incompatible with one another due to system configuration, company policy, software coding, etc. In some implementations, the content management system can include a first cloud-based system and the messaging client application can include a second cloud-based system, the first cloud-based system being incompatible or unassociated with the second cloud-based system.

The messaging content can include chats and discussions between users, team members, and/or collaborators on a project. The messaging content can be received by the content management system from multiple, different messaging client applications. The messaging content can further include digital content items such as documents, videos, pictures, GIFs, spreadsheets, or any other file or content suitable for the intended purpose and understood by a person of ordinary skill in the art. In some cases, the messaging content can include messages and content items from the messaging client application as provided by the users, team members, and/or collaborators. The messaging content also can include metadata (e.g., timestamps, username, and size of messaging content) to be embedded with existing content in a workspace or a shared folder to provide a timeline of progression of content.

The messaging content can be saved automatically to a smart workspace or manually added by a user to the smart workspace. The smart workspace can include options regarding auto-saving messages and content items to the smart workspace. The main user/administrator (e.g., the user that linked the smart workspace to the message application) can select which users automatically saved their messages and files to the smart workspace. For example, users can create smart workspaces that store user messages and content items directly from third-party messaging tools into the corresponding smart workspace. Furthermore, users can continuously add different chat groups from different third-party messaging tools to a corresponding smart workspace to further collaborate with users that utilize other third-party messaging tools. In-application commands (e.g., application icons and widgets) can be utilized by the users to generate smart workspaces, link smart workspaces to chat groups, request approvals, provide content items, and assign action items to corresponding smart workspaces. A virtual assistant of the smart workspace can also determine and/or select which users can automatically add files and/or messages to the smart workspace.

In some embodiments, a user can link a smart workspace to the messaging application by identifying a service and user account credentials for the messaging application to the smart workspace.

The messaging client application can be installed on or associated with a client device on a different cloud-based system. As users become entrenched in third-party messaging tools such as WhatsApp, LINE, WeChat, and ChatApp, it becomes difficult to coordinate these third-party messaging tools with a work-type environment (e.g., collaboration workspaces) because both entities are not on the same cloud-based server. As such, work-type environments are unable to provide features related to a proper work experience such as creating, organizing, and searching for content related to messages in the third-party messaging tools. In some cases, as described herein, the messaging client application can be communicatively coupled to a messaging integration service by an interface.

As previously described, certain software applications can access a content storage via an application programming interface on behalf of a user. For example, a software package such as an application running on a client device, can programmatically make API calls directly to a content management system when a user provides authentication credentials, to read, write, create, delete, share, or otherwise manipulate content.

At step 1004, method 1000 can include associating the messaging content with a workspace in the content management system, the workspace including a plurality of users that are authorized to access the workspace to collaborate with each of the plurality of users.

Users can create workspaces in the content management system that incorporate their messages from the messaging client applications. Workspaces can be smart workspaces as described herein. Workspaces can be shared folders, folders, directories, directory structures, destinations, or any other space suitable for the intended purpose and understood by a person of ordinary skill in the art.

Workspaces can further be generated at different entry points. For example, a workspace can be initially generated in anticipation of a future project; a workspace can be generated when a need arises to create a workspace; and a workspace can be generated after discussions have already occurred regarding a particular project. In some instances, users in the chat group can manually link the chat group with a workspace before, during, or after the conversation has ended. In some implementations, users can create smart workspaces that incorporate their messages and content items and link the smart workspace with third-party messaging tools. Furthermore, in-application commands (e.g., application icons and widgets) also can be utilized to generate smart workspaces, link smart workspaces to chat groups, request approvals, provide content items, and assign action items to corresponding smart workspaces. In other instances, a virtual assistant can scan a conversation in a chat group and determine that the chat group is related to a project (by detected keywords indicating a particular project). Upon detection of the project, the virtual assistant may automatically generate a smart workspace and begin storing conversations and content items present in the chat group into the smart workspace. In other instances, upon detection of the project, the virtual assistant may provide a request to the users (by message, link, or email) whether to generate a smart workspace to begin storing conversations and content items present in the chat group.

In other instances, the workspace can include a virtual assistant that assists the user and/or team members in the chat group. For example, the virtual assistant can determine whether a particular chat group belongs with a corresponding workspace. Thereafter, the virtual assistant can present the option of linking a chat group with a workspace to a user of the chat group. The workspace can process metadata received from the messaging applications regarding user messages and digital files added by the team members to determine whether a chat group belongs to a particular workspace.

The method 1000 can further include receiving a suggestion from a virtual assistant. The suggestion from the virtual assistant can suggest associating messaging content from a messaging application with an existing workspace or a new workspace in the content management system. In some cases, the suggestion to associate the messaging content with the existing workspace can be based on at least one of the messaging content, the plurality of users, and participants of a messaging thread associated with the messaging content. In other cases, the suggestion to associate the messaging content with the new workspace can be based on the messaging content.

In some instances, workspaces can store messages and digital files from users on different messaging applications. Though different messaging applications may include different software and be incompatible with one another, the workspace can gather messages and digital files from each of the messaging applications and store the same in a common workspace to facilitate the consolidation of material (e.g., messages and digital files) of a corresponding project.

Users can continuously add different chats and chat groups from different messaging client applications (as shown in FIG. 4), such as third-party messaging tools to a corresponding workspace so that the users may collaborate with one another. For example, more than one messaging client application can be associated with or linked to a single workspace such that content from the various messaging client applications can be compiled within the same workspace. The different messaging client applications can communicate with the content management system via corresponding interfaces. This makes it possible for content items (e.g., messaging and non-messaging content), which are related to the same workspace, but from different messaging client applications, to be conveniently compiled at one location.

In some implementations, the linking of the messaging client applications and the workspace can be initiated by a user or a virtual assistant. For example, a user can directly generate a workspace and provide instructions to communicatively couple with a chat group of a messaging client application of a client device. A user may also be in a chat group of a messaging client application and select an in-application command (e.g., workspace icon or widget) to communicatively couple the workspace and the chat group.

In other instances, a virtual assistant of the content management system may be a software service that is installed on the client devices and may be configured to scan and record messages in the chat group (e.g., utilizing software instructions, artificial intelligence, or machine learning). Scanning the chat group messages can include detecting keywords having some association with a project that the virtual assistant can then link with a workspace. For example, if the virtual assistant detects that the conversation in the chat group among the users pertains to a particular project relating to a commercial, the virtual assistant can either automatically generate a workspace and begin saving the messages and content items added in the chat group to the workspace, or the virtual assistant can inquire to the chat group by providing a message in the chat group, a link, or email to the users as to whether to generate a workspace to consolidate the messages and content items in the chat group to the workspace. Upon approval, the virtual assistant can then communicatively couple the chat group with the workspace and begin storing messages and content items added by the users.

As the chat groups of the messaging client applications of the client devices are communicatively coupled to the workspace, authentication information of the users and the workspace can be stored in the client device and content management system to allow continuous collaboration between the chat group and the workspace. Once a chat group is linked and accessible by the workspace, messages and content items added to the chat group can be stored and accessible in the workspace. Messages and content items stored in the workspace can be accessed by users associated and/or approval to access the workspace. Messages and content items added directly to the workspace by a user can be forwarded to the chat groups of the messaging client applications so that users in the chat group can view all messages and content items from the chat group and stored in the workspace in the respective messaging client applications. Users in the chat group may be alerted that new messages and content items have been added to the workspace by messages, links, and email.

In some cases, the associating of the messaging content with the workspace can be automatically associated by the content management system or a virtual assistant based on contents of the messaging content and the workspace. This automatic association can be facilitated by keywords, content type, or any other identifier suitable for the intended purpose and understood by a person of ordinary skill in the art.

In step 1006, the method 1000 can include providing access to the messaging content to the plurality of users that are authorized to access the workspace of the content management system. In some instances, a virtual assistant can perform the associating of the messaging content with the workspace in the content management system and the providing of the access to the messaging content to the plurality of users.

In some embodiments, the workspace may be a collaboration destination for plurality of users. In such embodiments, the users may require authorization to the workspace so that the user may access the messaging content of other authorized users of the workspace. As the workspace may be designated for a particular project, the users that gain access to the workspace may add, delete, or modify their messaging content to supplement the existing content in the workspace.

In some embodiments, the messaging content from various and different messaging client applications can be linked to one another with an associated workspace. The different messaging client applications can be linked to the associated workspace manually by a user associated with the workspace (e.g., a user can link a messaging client application with the workspace with an in-application command in the messaging client application or the user can link the workspace by adding a chat group from the messaging client application to the workspace), or automatically by a virtual assistant that can scan for relevant keywords associated with a project in the workspace and the different messaging client applications, thereby linking the two systems. Linking the two systems can include forwarding some or all conversations and content items to and from the messaging client applications and the workspace. For example, users may converse about the same workspace, but on different messaging client applications. In some cases, when the content management system determines that messaging content from different messaging client applications are related to the same workspace (e.g., by determining that the messaging content from the different messaging client applications include keywords that are associated with the workspace, whether by a user, administrator, or virtual assistant associated with the workspace), the content management system can link the messaging content from the various messaging client applications with the corresponding workspace. By doing so, the workspace can receive material (e.g., messages and content items) at one location from all of the messaging applications regarding the same project.

In some instances, the workspace can store messaging content and content items received from the messaging client applications of the users subsequent to the linking of the messaging client applications and the workspace, and also prior to the linking. For example, upon approval or automatically performed, the workspace can retrieve messaging content and content items already in a chat group of the messaging client application so that the workspace has a complete record of messaging content and content items associated with the chat group of the messaging client application. By accessing the workspace that is installed on the client device or other user equipment (e.g., a computer, laptop, and TV), the users can come back in the future and find all of the material relating to a particular project in one convenient location.

In some instances, the virtual assistant of the workspace may determine which messages and digital files correspond to which workspaces based on keywords, types, association, or any other corresponding information suitable for the intended purpose and understood by a person of ordinary skill in the art. As the workspace is further populated with messaging content and digital content from the messaging client applications, the workspace can save the messaging content and the digital content accordingly in the corresponding workspace for future use by authorized users. The messaging content and the digital content can also be time stamped and include user information to determine which user added the message and digital files.

At step 1008, method 1000 can include embedding the messaging content in the workspace of the content management system.

In some cases, the messaging content is stored in the content management system in a corresponding workspace for convenient access to authorized users. The messaging content can also be embedded in the workspace to illustrate a linear progression (e.g., historical progression) of a corresponding project so that team members can see how a particular project changed over time. For example, an initial project may begin with just an idea, and as users provide their input and feedback, the user (at a future time) can look back and see who said what in order to determine how the project came to fruition. This can be very helpful because users can see how and when a particular project changed direction or how a direction was accepted by the group of users.

The messaging content from the messaging client applications and the digital content from the workspace can also be timestamped so that when the messaging content and the digital content are incorporated into the workspace, the workspace can be organized such that the messaging content and the digital content are arranged in an orderly manner.

To provide a more complete picture of a project's development, previous messaging content can also be incorporated into the workspace along with current messaging content and digital content. For example, when a chat group is linked with a workspace, all or a portion of the previous messages in the chat group can be imported into the workspace. The workspace can be populated with previous messages and digital content added by the users. The users can also designate which portions of the previous messaging content is added to the workspace. For example, a user can designate a specific time period of previous messaging content to be added to the workspace. The importation of previous messaging and digital content can begin automatically when the workspace is linked with the chat groups from the various messaging applications.

Furthermore, a virtual assistant or a software service of the workspace can scan previous messaging content when a chat group is linked with the workspace to determine whether to add the previous messaging content to the workspace. For example, the virtual assistant or the workspace can search for keywords that are associated with subject matter of the workspace to determine whether the previous messaging content is relevant to the workspace. Such a determination may be performed by the virtual assistant or the workspace with software instructions, artificial intelligence, or machine learning. Users can also provide instructions to the virtual assistant or workspace that includes keywords to be associated with the workspace. For example, if the keyword instructions include the words "project" and "alpha," the virtual assistant and the workspace can scan the previous messaging content for "project" and "alpha." If they are not found, the virtual assistant or the workspace may not store the previous messaging content. If they are found, the virtual assistant or the workspace may store the entire previous messaging content to capture the entire historical record of the project associated with the workspace. If so, the workspace can determine whether the entire previous messaging content is to be added to the workspace or whether certain portions of the previous messing content is to be added to the workspace. In some instances, the virtual assistant can determine and present relevant portions of the previous messaging content to a user for approval prior to adding to the workspace.

Moreover, there are many times when users are trying to determine how a decision was made for a corresponding workspace that has been archived. Previously, in order to do so, the user would have to look back at their third-party tool and search for their comments in a manual manner, which could take a lot of time if even found.

Here, in some cases, the user's comments are conveniently in the associated workspace and the user can then search for their archived comments and subject matter accordingly. As years may pass by between projects, the ability for a user to go back to a workspace and read all of the messaging content associated with the workspace can be very helpful in providing context to the workspace.

As described herein, when a workspace is linked with chat groups from multiple messaging applications by a user or a virtual assistant, the workspace can automatically begin consolidating all or a portion of the previous and current messaging content (e.g., user messages and digital files added by the users) received from the chat group members. An approved user can then begin searching the workspace at any given time to find relevant messages or particular documents. As the messaging content of the workspace is searchable and timestamped, at any given time, the user can search the workspace for keywords, users, and/or content specific material.

A search can also initially be performed automatically by the virtual assistant. As the smart workspace is linked with the chat group, the virtual assistant can determine whether a request has occurred in the conversation between the users of the messaging application. The virtual assistant, upon receiving keywords, can begin a search for the keyword. Upon completion of such a search, the virtual assistant can then present the search results to the user. The user can also decide whether the file or message found by the virtual assistant is the correct file or message requested by the search. Upon election, the virtual assistant can add the requested content item to the chat group conversation. A user can also perform a keyword search manually to find particular content items and conversations.

At step 1010, method 1000 can include generating an action item based on the messaging content.

For example, in-application commands can be utilized to request approvals and assign action items to the corresponding workspace. As users collaborate with one another, certain action items may become important for the group of users to tackle. Moreover, tasks may arise during a conversation, and so as not to forget, actions items can be populated in the workspace to remind all team members of any outstanding tasks. Action items can also be added by any authorized user in the chat group. The action items may also include a selected check box to designate whether a task has been completed. When a task on the action item list is completed, the workspace may notify the chat group in the messaging application by adding a message stating that a task has been completed.

In some implementations, a list of action items can be generated by a user and stored and managed by the workspace. Upon generation of the list of action items, the workspace can store a copy of the list of action items to be performed by the users of the chat group and provide the same to the chat group upon request. For example, as similarly shown in FIGS. 8A and 8B, a user can type in the chat group "@workspace create action item list including A, B, and C." As the workspace is linked to the chat group and receives all messages and content items from the chat group, the workspace recognizes that a user has requested that a list of action items be generated for A, B, and C. Thereafter, if a user wants to see any outstanding lists of action items, the user can type in the chat group "@workspace show action item lists." The workspace would then provide the list of action items A, B, and C to the chat group of the messaging client applications for all of the users to review.

Examples of action items (further described below) include "to do" lists, approval requests, funding requests, new user/member requests, or any other request or action item suitable for the intended purpose and understood by a person of ordinary skill in the art.

In some cases, the action item can include a task to be completed by a user of the plurality of users. For example, the action item can include "to do" lists from a user of the plurality of users. A user may initiate a "to do" list by populating, generating, or requesting that a list be presented with various actions to be completed by users associated with the workspace. A request for the "to do" list can originate at the messaging client application or at the workspace. Once the "to do" list is generated, users associated with the workspace can view the "to do" list so that corresponding users can begin completing each task. Once a task is completed, the "to do" list can be automatically or manually updated by a user to satisfy the completed task. For example, applying a "check mark" can indicate that a task is completed.

In some implementations, a list of tasks can be generated by a user and stored and managed by the workspace. Upon generation of the list of tasks, the workspace can store a copy of the list of tasks to be performed by the users of the chat group and provide the same to the chat group upon request. For example, as similarly shown in FIGS. 8A and 8B, a user can type in the chat group "@workspace create tasks list including A, B, and C." As the workspace is linked to the chat group and receives all messages and content items from the chat group, the workspace recognizes that a user has requested that a list of tasks be generated for A, B, and C. Thereafter, if a user wants to see any outstanding lists of tasks, the user can type in the chat group "@workspace show task lists." The workspace would then provide the list of tasks A, B, and C to the chat group of the messaging client applications for all of the users to review.

In some cases, the action item can include a request for funding approval from a user of the plurality of users. For example, the action item can include a request for a single or a plurality of funding request approvals from a user of the plurality of users. A user may initiate a funding request by populating, requesting, or generating a funding approval request for a particular item, event, or reimbursement. The funding approval request can be presented to the users associated with the workspace so that relevant users can be alerted of the funding request.

In some implementations, funding approvals can be generated by a user and stored and managed by the workspace. Upon generation of funding approvals, the workspace can store a copy of funding approvals to be approved by the users of the chat group and provide the same to the chat group upon request. For example, as shown in FIGS. 8A and 8B, a user can type in the chat group "@workspace request approval from @anya on $3K for catering." As the workspace is linked to the chat group and receives all messages and content items from the chat group, the workspace recognizes that a user has requested funding approval for catering at $3K. Thereafter, if a user wants to see any outstanding funding approvals, the user can type in the chat group "@workspace show funding approvals." The workspace would then provide the fund approvals to the chat group of the messaging client applications for all of the users to review for approval.

A request for funding approval can also originate at the messaging client application or at the workspace. Once the funding approval request is generated, users associated with the workspace can view the funding approval request in the workspace or the messaging client application so that corresponding users can determine how to proceed with the funding request. Once the funding approval request is received by the appropriate user, the corresponding user can begin determining whether the funding request should or should not be approved.

If the funding request should not be fulfilled, the appropriate user can deny the funding approval request. If the funding request should be fulfilled, the appropriate user can "approve" the funding request and indicate that the funding request has been completed. For example, applying a "check mark" can indicate that the funding request has been approved and completed.

In some cases, the action item can include a request for membership of a user of the plurality of users to the workspace. For example, the action item can include a request for a user to join the workspace. A user may initiate a membership request by populating, generating, or requesting membership approval for a workspace from the users of the messaging client application. The request for membership can originate at the messaging client application.

In some implementations, membership requests can be generated by a user for another user and stored and managed by the workspace. Upon generation of membership requests, the workspace can store a copy of membership requests to be approved by the users of the chat group and provide the same to the chat group upon request. For example, as similarly shown in FIGS. 8A and 8B, a user can type in the chat group "@workspace membership request for Anya at anya@gmail.com." As the workspace is linked to the chat group and receives all messages and content items from the chat group, the workspace recognizes that a user has requested membership for Anya at anya@gmail.com. Thereafter, if a user wants to see any outstanding membership requests, the user can type in the chat group "@workspace show membership requests." The workspace would then provide the membership requests to the chat group of the messaging client applications for all of the users to review for approval. If the users of the chat group disapprove Anya's membership request, the workspace will remove Anya's membership request from the record. If an authorized user of the chat group approves Anya's membership request, the workspace can provide Anya with a message, link, or email authorizing access to the chat group and the workspace. The authorization message can also include a link to the chat group and the workspace.

Once the membership request is generated, users associated with the workspace can view the membership request so that corresponding users can determine how to proceed with the membership request. Once the membership request is received by the users, an authorized user can make a determination of whether to provide authorization to the requesting user to access the workspace. If the requesting user is not to be admitted to the workspace, the authorized user can deny the membership request.

If the membership request should be authorized, the appropriate user can "approve" the membership request and indicate that the membership request has been completed. For example, applying a "check mark" can indicate that the membership request has been approved and completed. The workspace can then provide a message, link, or email authorizing access to the chat group and the workspace. The authorization message can also include a link to the chat group and the workspace. The newly authorized user can then gain access to the workspace as requested.

Moreover, the action items as described herein can be based on one or both of the messaging content of the messaging client application and the existing content in the workspace. For example, as a conversion proceeds in the messaging client application, an action item such as a "to do" list may be populated for the users in the chat room for the content already in the workspace. In some cases, one user may be tasked with obtaining speakers for an event as provided in the workspace, while another user may be tasked with preparing a presentation with the content in the workspace. In some cases, action items may be generated by the content management system automatically based on the messaging content and/or the existing content associated with the workspace.

In some cases, method 1000 can further include receiving at the content management system a request to initiate the generating of the action item. The request may be initiated by a user or automatically initiated by the messaging client application based on messaging content of a user.

In some embodiments, virtual assistant 422 can monitor a conversation in a workspace to determine that a new topic has been introduced and can suggestion or take the actions such as starting a new workspace for the new topic. The assistant could also cause a new folder to be created in content management system 110 and share it with certain users, or identify certain comments as important and surface those in additional interfaces that are associated with content management system 110.

While, in the embodiments addressed herein, aspects of the present technology depend on virtual assistant 422 being a part of content management system 110, in some embodiments, benefits of the present technology can also be provided by a virtual assistant that is provided by a third party. For example, a third party virtual assistant could be configured to interact with content management system via one or more APIs, whereby the third party virtual assistant could provide documents, comments, tasks etc. to messaging intergration service 420.

Figure 11:
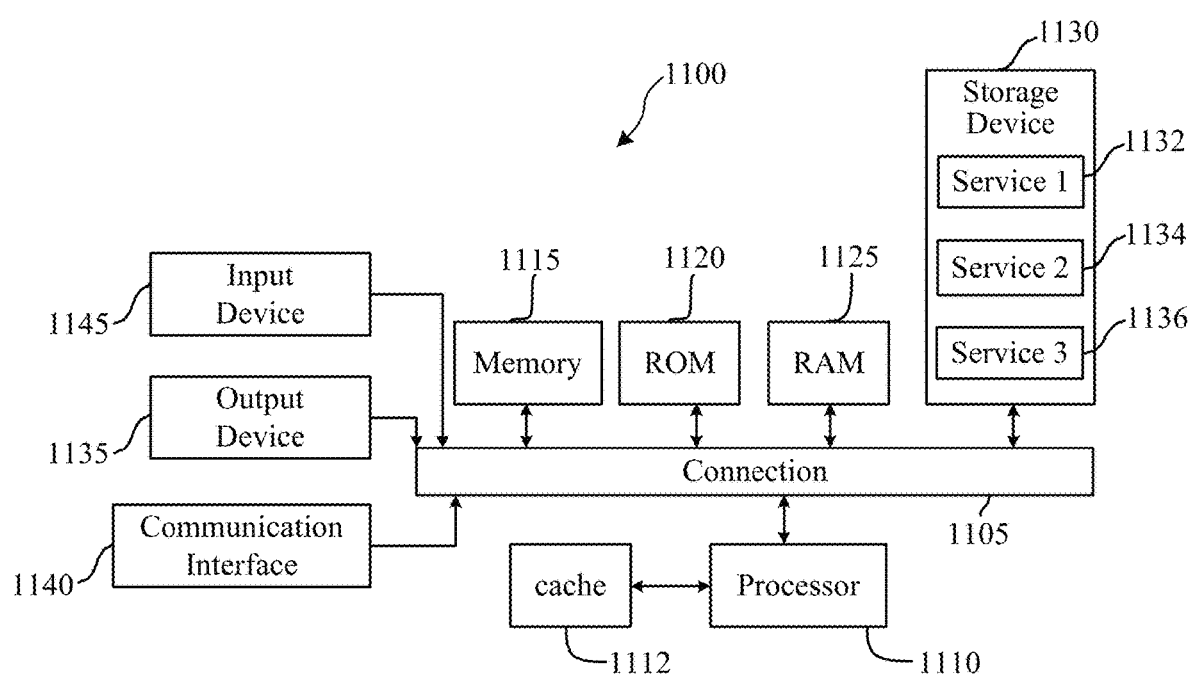
FIG. 11 illustrates an example system for implementing various aspects of the present technology.

FIG. 11 shows an example of computing system 1100, which can be for example any computing device making up client device 150, content management system 110 or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some cases, computing system 1100 is a distributed system in which the functions described in this disclosure can be distributed within a datacenter, multiple datacenters, a peer network, etc. In some cases, one or more of the described system components represents many such components each performing some or all of the function for which the component is described. In some cases, the components can be physical or virtual devices.

Example computing system 1100 includes at least one processing unit (CPU or processor) 1110 and connection 1105 that couples various system components including system memory 1115, such as read only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1130 can include software services, servers, services, etc., that when the code that defines such software is executed by the processor 1110, it causes the system to perform a function. In some cases, a hardware service that performs a particular function can include the software component stored in a computer-readable medium in connection with the necessary hardware components, such as processor 1110, connection 1105, output device 1135, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some cases, a service can be software that resides in memory of a client device and/or one or more servers of a content management system and perform one or more functions when a processor executes the software associated with the service. In some cases, a service is a program, or a collection of programs that carry out a specific function. In some cases, a service can be considered a server. The memory can be a non-transitory computer-readable medium.

In some cases, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B. In other words, claim language reciting "at least one of A and B" means A and/or B.

What is claimed is:

1. A computer-implemented method comprising:
   receiving messaging content from a virtual assistant embedded in a messaging client application that is integrated into a content management system, wherein the virtual assistant is linked to a workspace in the content management system, the content management system accesses the messaging client application through user account credentials to the messaging client application, and the virtual assistant is configured to interpret at least a portion of a conversation taking place on the messaging client application, wherein the interpretation identifies a context of the portion of the conversation between participants;
   associating by the virtual assistant the context of the messaging content with the workspace in the content management system, the workspace including a plurality of users that are authorized to access the workspace to collaborate;
   providing access to the messaging content to the plurality of users that are authorized to access the workspace of the content management system;
   embedding by the virtual assistant the messaging content in the workspace of the content management system; and
   generating, by the virtual assistant, a comment at the messaging client application responsive to an action taken by the virtual assistant based on the interpretation of the conversation or at least one of the plurality of users on an item of the messaging content related to the context of the portion of the conversation.

2. The computer-implemented method of claim 1, further comprising receiving a suggestion from the virtual assistant, the suggestion from the virtual assistant suggests associating the messaging content with the workspace in the content management system.

3. The computer-implemented method of claim 2, wherein the workspace is an existing workspace, wherein the suggestion to associate the messaging content with the existing workspace is based on at least one of the messaging content, the plurality of users, or the participants of a messaging thread associated with the messaging content.

4. The computer-implemented method of claim 2, wherein the workspace is a new workspace, wherein the suggestion to associate the messaging content with the new workspace is based on the messaging content.

5. The computer-implemented method of claim 1, further comprising determining, by the virtual assistant, that keywords found in the messaging content of the messaging client application are associated with the workspace of the content management system.

6. The computer-implemented method of claim 1, further comprising providing the messaging content from the messaging client application associated with the workspace to a second messaging client application, the messaging client application being on a first cloud-based system and the second messaging client application being on a second cloud-based system, the first cloud-based system being different from the second cloud-based system.

7. The computer-implemented method of claim 1, further comprising receiving at the content management system a request to initiate generating of an action item.

8. The computer-implemented method of claim 1, wherein the associating of the messaging content with the workspace is automatically performed based on keywords found in the messaging content and the workspace.

9. The computer-implemented method of claim 1, further comprising:
   associating the messaging content from a second messaging client application with the workspace in the content management system; and
   embedding the messaging content from the second messaging client application in the workspace along with existing content, wherein the existing content includes the messaging content from the messaging client application.

10. The computer-implemented method of claim 1, further comprising:
    generating, by the virtual assistant, an action item in the workspace based on the messaging content.

11. A system comprising:
    one or more processors; and
    at least one computer-readable storage medium having stored therein instructions which, when executed by the one or more processors, cause the system to:
        receive messaging content from a virtual assistant embedded in a messaging client application that is integrated into a content management system, wherein the virtual assistant is linked to a workspace in the content management system, the content management system accesses the messaging client application through user account credentials to the messaging client application, and the virtual assistant is configured to interpret at least a portion of a conversation taking place on the messaging client application, wherein the interpretation identifies a context of the portion of the conversation between participants;
        receive a suggestion from the virtual assistant, the suggestion from the virtual assistant suggests associating the messaging content with the workspace in the content management system, the workspace being an existing workspace or a new workspace in the content management system;

associate by the virtual assistant the context of the messaging content with the workspace in the content management system based on the suggestion from the virtual assistant, the workspace including a plurality of users that are authorized to access the workspace to collaborate;

provide access to the messaging content to the plurality of users that are authorized to access the workspace of the content management system; embed the messaging content in the workspace of the content management system; and generate, by the virtual assistant, a comment at the messaging client application responsive to an action taken by the virtual assistant based on the interpretation of the conversation or at least one of the plurality of users on an item of the messaging content related to the context of the portion of the conversation.

12. The system of claim 11, wherein the suggestion to associate the messaging content with the new workspace is based on the messaging content.

13. The system of claim 11, wherein the instructions which, when executed by the one or more processors, further cause the system to determine, by the virtual assistant, that keywords found in the messaging content of the messaging client application are associated with the workspace of the content management system.

14. The system of claim 11, wherein the instructions which, when executed by the one or more processors, further cause the system to provide the messaging content from the messaging client application associated with the workspace to a second messaging client application, the messaging client application being on a first cloud-based system and the second messaging client application being on a second cloud-based system, the first cloud-based system being different from the second cloud-based system.

15. The system of claim 11, wherein the instructions which, when executed by the one or more processors, further cause the system to receive at the content management system a request to initiate generating an action item based on the messaging content.

16. The system of claim 11, wherein the instructions which, when executed by the one or more processors, further cause the system to:

associate the messaging content from a second messaging client application with the workspace in the content management system; and embed the messaging content from the second messaging client application in the workspace along with existing content, wherein the existing content includes the messaging content from the messaging client application.

17. The system of claim 11, wherein the suggestion to associate the messaging content with the existing workspace is based on at least one of the messaging content, the plurality of users, or the participants of a messaging thread associated with the messaging content.

18. A non-transitory computer-readable medium comprising:

instructions stored therein which, when executed by one or more processors, cause the one or more processors to:

receive a first messaging content from a virtual assistant embedded in a messaging client application that is integrated into a content management system;

receive a second messaging content from the virtual assistant embedded in a second messaging client application that is integrated into the content management system, wherein the virtual assistant is linked to a workspace in the content management system, the content management system accesses the messaging client application through user account credentials to the messaging client application, and the virtual assistant is configured to interpret at least a portion of a conversation taking place on the messaging client application, wherein the interpretation identifies a context of the portion of the conversation between participants;

associate by the virtual assistant the context of the first and the second messaging content with the workspace in the content management system, the workspace including a plurality of users that are authorized to access the workspace to collaborate;

provide access to the first and the second messaging content to the plurality of users that are authorized to access the workspace of the content management system;

embed by the virtual assistant the first and the second messaging content in the workspace of the content management system; and generate, by the virtual assistant, a comment at the messaging client application responsive to an action taken by the virtual assistant based on the interpretation of the conversation or at least one of the plurality of users on an item of the messaging content related to the context of the portion of the conversation.

19. The non-transitory computer-readable medium of claim 18, wherein the instructions which, when executed by the one or more processors, further cause the one or more processors to receive a suggestion from the virtual assistant, the suggestion from the virtual assistant suggests associating the messaging content with the workspace in the content management system based on at least one of the first messaging content, the plurality of users, or the participants of a messaging thread associated with the first messaging content.

20. The non-transitory computer-readable medium of claim 18, wherein the instructions which, when executed by the one or more processors, further cause the one or more processors to determine, by the virtual assistant, that keywords found in the first messaging content of the first messaging client application are associated with the workspace of the content management system.

21. The non-transitory computer-readable medium of claim 18, wherein the instructions which, when executed by the one or more processors, further cause the one or more processors to receive a suggestion from the virtual assistant, wherein the suggestion from the virtual assistant suggests associating the first messaging content with an existing workspace or a new workspace in the content management system.

* * * * *